(12) United States Patent  
Siris

(10) Patent No.: US 7,944,839 B2  
(45) Date of Patent: May 17, 2011

(54) METHOD OF RESOURCE CONTROL IN A WIRELESS NETWORK

(75) Inventor: Vasilios A Siris, Crete (GR)

(73) Assignee: British Telecommunications public limited company, London (GB)

( * ) Notice: Subject to any disclaimer, the term of this patent is extended or adjusted under 35 U.S.C. 154(b) by 1794 days.

(21) Appl. No.: 10/495,329

(22) PCT Filed: Nov. 20, 2002

(86) PCT No.: PCT/GB02/05240  
§ 371 (c)(1),  
(2), (4) Date: May 12, 2004

(87) PCT Pub. No.: WO03/049319  
PCT Pub. Date: Jun. 12, 2003

(65) Prior Publication Data  
US 2005/0003824 A1    Jan. 6, 2005

(30) Foreign Application Priority Data

Nov. 30, 2001   (EP) ................................... 01310034  
Nov. 30, 2001   (EP) ................................... 01310035

(51) Int. Cl.  
*H04J 3/14*    (2006.01)
(52) U.S. Cl. ........................................ 370/236; 370/278
(58) Field of Classification Search .................. 370/235, 370/238  
See application file for complete search history.

(56) References Cited

U.S. PATENT DOCUMENTS

| | | | |
|---|---|---|---|
| 5,794,140 A | 8/1998 | Sawyer | |
| 6,055,571 A * | 4/2000 | Fulp et al. ..................... | 709/224 |
| 6,404,738 B1 * | 6/2002 | Reininger et al. ............ | 370/236 |
| 6,434,380 B1 * | 8/2002 | Andersson et al. ........... | 455/406 |
| 6,477,370 B1 * | 11/2002 | Sigler et al. ................... | 455/427 |
| 6,681,156 B1 * | 1/2004 | Weiss ............................ | 700/251 |
| 7,535,853 B2 * | 5/2009 | Briscoe et al. ................ | 370/252 |
| 2002/0160764 A1 * | 10/2002 | Gorsuch ....................... | 455/419 |
| 2003/0097461 A1 * | 5/2003 | Barham et al. ................ | 709/235 |
| 2004/0010592 A1 * | 1/2004 | Carver et al. ................. | 709/226 |

(Continued)

FOREIGN PATENT DOCUMENTS

| DE | 19942947 A | 3/2001 |
|---|---|---|
| WO | WO 01/89191 | 11/2001 |
| WO | WO 01/89191 A1 | 11/2001 |

OTHER PUBLICATIONS

Liu et al. "Forward-link CDMA Resource Allocation Based on Pricing", Data Inspec. 'Online! Institute of Electrical Engineers, Stevenage, GB; Database Accession No. 6991341, XP002203537 & 2000 IEEE Wireless Communications and Networking Conference, Conference Record (CAT. No. 00TH8540), Proceedings of IEEE Conference on Wireless Communications and Networking, Chicago, ILL., USA, Sep. 23-28, 2000, pp. 1410-1414, vol. 3.

(Continued)

*Primary Examiner* — Jianye Wu  
(74) *Attorney, Agent, or Firm* — Nixon & Vanderhye P.C.

(57) ABSTRACT

Wireless resource control is used in a wireless user terminal. A user utility function is stored which gives a user utility value for the user terminal as a function of one or more wireless resources. Price per unit of each wireless resource usage is also stored. An indication of the price per unit of usage is received over a wireless link from another wireless terminal. A rate of wireless resource usage is calculated using the indicated price per unit of wireless resource usage as an input to the user utility function such that the user utility value is maximized.

13 Claims, 16 Drawing Sheets

U.S. PATENT DOCUMENTS

2004/0258091 A1* 12/2004 Meyer et al. .................. 370/469
2005/0286488 A1* 12/2005 Briscoe et al. ................ 370/351

OTHER PUBLICATIONS

Goodman et al., "Power Control for Wireless Data", Database Inspec. 'Online! Institute of Electrical Engineers, Stevenage, GB; Database Accession No. 6559011, XP 002203538, & 1999 IEEE International Workshop on Mobile Multimedia Communications (MOMUC '99) (CAT. No. 99EX384), 1999 IEEE International Workshop on Mobile Multimedia Communications, San Diego, CA, Nov. 15-17, 1999, pp. 55-63.

Liu et al., "Forward-Link CDMA Resource Allocation Based on Pricing", 2000 IEEE Wireless Communications and Networking Conference. Conference Record (CAT. No. 00TH8540), Proceedings of IEEE Conference on Wireless Communications and Networking, Chicago, ILL, USA, Sep. 23-28, 2000, pp. 1410-1414, vol. 3, XP003219752.

Kelly, "Charging and Rate Control for Elastic Traffic", European Transactions on Telecommunications, Eurel Publication, Milano, IT, vol. 8, No. 1, 1997, pp. 33-37, XP000643099.

Ramani et al., "Explicit Congestion Notification (ECN) in TCP over wireless Network", 2000 IEEE International Conference on Personal Wireless Communications, Conference Proceedings (CAT. No. 00TH8488), Proceedings of IEEE International Conference on Personal Wireless Communications (ICPWC), Hyderabad, India, Dec. 17-20, 2000, pp. 495-499, XP002199753.

Kim et al., "Congestion Control for Best-Effort Services in Wireless Access Network", Joint $4^{TH}$ IEEE International Conference on ATM (ICATM'01) and High Speed Intelligent Internet Symposium, ICATM 2001 (CAT. No. 00EX486), Joint $4^{TH}$ IEEE International Conference on ATM (ICATM'01) and High Speed Intelligent Internet Symposium, ICATM 2001, pp. 217-221, CP002199754.

Institute of Electrical Engineers, Stevenage, GB: Peijuan Lieu et al, "Forward-link COMA resource allocation based on pricing", Database accession No. 6991341, XP002203537 & 2000 IEEE Wireless Communications and Networking Conference. Conference Record (CAT. No. 00TH8540), Proceedings of IEEE Conference on Wireless Communications and Networking, Chicago, IL, USA, Sep. 23-28, 2000, pp. 1410-1414, vol. 3, 2000, Piscataway, NJ, USA, IEEE, USA.

Institute of Electrical Engineers, Stevenage, GB, Goodman D et al, "Power control for wireless data", Database accession No. 6559011, XP002203538 & 1999 IEEE International Workshop on Mobile Multimedia Communications, San Diego, CA, USA Nov. 15-17, 1999, pp. 55-63, 1999, Piscataway, NJ, USA, IEEE, USA.

* cited by examiner

METHOD OF RESOURCE CONTROL IN A WIRELESS NETWORK

This application is the US national phase of international application PCT/GB02/05240 filed 20 Nov. 2002 which designated the U.S. and claims benefit of EP 01310034.2 and EP 01310035.9, dated 30 Nov. 2001, respectively, the entire content of which is hereby incorporated by reference.

BACKGROUND

1. Technical Field

The present invention relates to a method of resource control for use within a wireless network, and in particular to a method of resource control wherein congestion pricing is used to determine resource allocation between multiple users.

2. Related Art

Procedures for efficient control and management of wireless network resources are becoming increasingly important. This is due to two factors: First, there is a limited ability, compared to fixed wire-line networks, for increasing the capacity of mobile wireless networks. Second, emerging multimedia services and applications will increase the demand for bandwidth in wireless networks.

Congestion pricing has been identified as a flexible mechanism for efficient and robust resource control in fixed wire-line networks, as discussed by F. P. Kelly in *Charging and rate control for elastic traffic*, European Transactions on Telecommunications, vol. 8 pp. 33-37 January 1997. Congestion pricing has also already been considered for wireless networks, as will become apparent from the following discussion of the prior art in the field.

The authors of Goodman et al. *Power control for wireless data* IEEE personal Comm. 7:48-54, April 2000 consider a utility which is interpreted as the number of information bits transmitted per unit of energy. The utility has the property that for a bit-energy-to-noise-density ratio Eb/No larger than some value, the utility decreases with the increase of Eb/No. It is shown that for the non-cooperative game where mobile users adjust their power to maximize their utility, there exists a unique Nash equilibrium. In the equilibrium all users achieve the same bit-energy-to-noise-density ratio Eb/No. Moreover, the latter satisfies the same equation as the one that the optimal target bit-energy-to-noise-density ratio that maximizes the net utility in our framework satisfies.

Xiao et al. *Utility-based power control in cellular wireless systems* Proc of IEEE INFOCOM'01 Anchorage Ak. April 2001 consider a utility, having a sigmoid shape, that is a function of the bit-energy-to-noise-density ratio, and formulate a utility-based distributed power control algorithm where each user seeks the maximize his net utility, i.e., the difference between his utility minus the cost of power, which is taken to be a linear function of the power. The authors indicate that price adjustment can be used to control resource usage, without however relating this to constraints on the wireless resources. They propose a function where prices are proportional to the interference a mobile host experiences, hence the price per unit of power can be different for different mobile hosts. The work considers only the downlink, indicating that the uplink could be handled similarly. If, however, in the uplink the transmit power is charged, this does not discourage mobile hosts from declaring a power different from their true power or not update the price per unit of power according to the above.

The authors of Liu et al, *Forward-Link CDMA resource allocation based on pricing*, IEEE Wireless Communications and Networking conference (WCNC), 2000, consider downlink resource allocation in CDMA networks based on pricing. The user utility is a step function of the bit-energy-to-noise-density ratio, and the price each mobile is charged with contains a constant term (price per code) and a term linear in the transmitted power from the base station. It is also assumed that each base station is charged by some amount that is proportional to the total power with which it is transmitting; this charge accounts for the interference it is causing to neighbouring cells. They then go on to investigate the problem of maximizing the total utility minus the base station's power charge and of the total revenue (payment received from mobile hosts) minus the base station's power charge.

The authors of Ji et al, *Non-cooperative uplink power control in cellular radio systems* Acm/Baltzer Wireless Networks Journal Vol 4. pp 233-240, 1998 consider a utility that is a monotonically increasing concave function of the bit-energy-to-noise-density ratio and a monotonically decreasing concave function of the mobile host (transmitter) power. Each mobile adjusts its sending power (the rate is considered fixed) so as to maximize its utility. Under some assumption regarding the utility, a Nash (non-cooperative) equilibrium exists.

The work in Lu et al, *Integrating power control, error correction coding and scheduling for a CDMA downlink system* IEEE J. Select. Areas Commun. 17(5):978-989, June 1999 discusses in a qualitative manner the concept of utility, specifically as a function of bandwidth and bit error rate, at various levels of CDMA system (user, individual cell, and whole system).

The authors of Elaoud et al. *Adaptive Allocation of CDMA resources for network level QoS assurances*, ACM/IEEE International Conference on Mobile Computing and Networking (MOBICOM) pp 191-199, 2000 consider a cost function with two components, one linear in the transmitted power and the other linear in the target Eb/No. Using this cost function they formulate problems that take into account the deadline requirements of each packet, and adapt the target Eb/No based on these deadlines; it is assumed that the network-level QoS requirements translate to such deadline requirements.

Another line of research has considered the problem of maximizing the aggregate throughput in CDMA systems. The work in Sampath et al, *Power control and resource management for a multimedia CDMA wireless system*, Proc of IEEE Int Symp Personal, Indoor, Mobile Radio Commun (PIMRC), Toronto, Canada, 1995 considers the problems of minimizing the aggregate power and of maximizing the sum of rates, given target Eb/No values and constraints on the maximum power and minimum rate. Moreover, the authors of Ramakrishna et al, *A scheme for throughput maximisation in a dual class CDMA system* IEEE J. Select Areas Commun, 16(6):830-844, August 1998, show that in hybrid CDMA/TDMA systems supporting real-time (delay intolerant) and non real-time (delay tolerant) traffic, both with fixed target Eb/No values, the sum of rates of the non real-time traffic is maximized if it is scheduled so that only one non real-time source sends traffic in each time slot.

Whereas the previous work considered fixed Eb/No values, Honig et al, *Allocation of DS-CDMA parameters to achieve multiple rates and qualities of service* IEEE Trans on Vehicular Technology 49(2):506-519, March 2000 and Oh et al *Dynamic Spreading gain in multiservice CDMA networks* IEEE J. Select. Areas Commun. 17(5):918-927 May 1999, both consider the case where both target Eb/No and the rate (equivalently, the spreading gain) can be controlled. More particularly, Honig et al considers a system with two classes, for data and voice, and investigates the problem of assigning powers processing gains to each class in order to optimise performance in terms of average delay for data and bit error rate for voice; it is assumed that traffic for both types follows a Poisson process. Oh et al. investigates the maximization of throughput (taking into account losses in the wireless network) and shows that the optimal spreading gain is inversely proportional to the multiple access interference and that the optimal retransmission probability for data traffic is one.

Although many of these references use the concept of utility to optimise sending rate over a wireless link, none consider a framework that seamlessly encompasses all network resources (wireless spectrum, base station power, mobile station battery, as well as fixed network resources), and also none consider any of the engineering to realise this. The essential distinction is between a theoretical utility function and a practical QoS buying policy to implement it.

Further work on engineering of congestion control for wireless networks can be found in Montenegro et al, "Long thin networks" RFC2757 (January 2000), http://www.ietf.org/rfc/rfc2757.txt, Inamura et al, "TCP over 2.5G and 3G wireless networks", (February 2001), http://search.ietf.org/internet-drafts/draft-ietf-pilc-2.5g3g-03.txt, and from the Uni of Bejing/Nokia, such as "A proposal to apply ECN into Wireless and Mobile Networks", Jian Ma, Fei Peng (Sep. 17, 2001), http://www.ietf.org/internet-drafts/draft-fpengy-ecn-04.txt. The latter document in particular suggests distinguishing congestion from loss using explicit congestion notification (ECN) instead of packet drop.

As will be apparent from the review of the prior art given above, the vast majority of prior work that consider the application of microeconomic approaches to resource control in wireless networks have focused exclusively on the cost of battery power. This was motivated by the fact that battery power was, and continues to be, a scarce resource in mobile hosts. In future 3G wireless networks supporting multimedia services with high bandwidth requirements, however, wireless resources are also likely be scarce, hence in addition to the cost of battery power, it will be necessary to incorporate the congestion of wireless resources in power and rate control procedures.

Moreover, the widespread use of the Internet necessitates the seamless interworking of protocols and procedures in mobile wireless networks, with those in fixed IP-based networks. One important procedure is congestion control, which in IP networks is performed mainly by TCP (Transmission Control Protocol). There is therefore also the need to provide for seamless congestion control signalling, which seamlessly integrates a wireless network with that of any fixed network over which the wireless network's data traffic may also have to flow.

BRIEF SUMMARY

In order to address the above problems, the present exemplary embodiment provides a method of wireless resource allocation wherein a radio network controller sets a price for the use of wireless resources such as bandwidth and transmission power, and communicates the set price to mobile users. The users then select the rate of usage of the wireless resource such that their utility, being the amount of data throughput over the wireless link, is maximized with respect to the price that each user is prepared to pay for the wireless resource usage. Preferably, the communication of the price per unit of wireless resource to the mobile user terminals is performed at the radio network controller by setting an appropriate proportion of explicit congestion notification (ECN) bits. In this way the congestion control is seamlessly integrated between the wireless and fixed networks, as the mobile users simply see the ECN marks without knowing whether the congestion present is in the wireless or the wired network.

In view of the above, from a first aspect the present invention provides a method of wireless resource control for use in a wireless user terminal, the method comprising the steps of:

a) storing a user utility function which gives a user utility value (U) for the user terminal as a function of one or more wireless resources, and price per unit of the or each wireless resource usage;

b) receiving an indication of the price per unit of wireless resource usage over a wireless link from another wireless terminal; and c) calculating a rate of wireless resource usage using the indicated price per unit of wireless resource usage as an input to the user utility function such that the user utility value (U) is maximised.

In the above the advantage is obtained that congestion charging can be performed based upon a user's actual usage of real wireless resources within the network, rather than simply notional use of user battery power as in the prior art. As the price is received from the network it can reflect actual network loading at any particular time, and thereby be of immediate use to each user terminal in deciding its resource usage without any further processing required.

Preferably the receiving step further comprises the steps of: receiving data packets from the other wireless terminal, a sub-set of said packets having one or more explicit congestion notification (ECN) bits set; and calculating the price per unit of wireless resource from the proportion of data packets in the sub-set in comparison to the total number of data packets received.

The use of the ECN bit for congestion control has recently been proposed as a standard for fixed networks (see RFC 3168 at www.ietf.org), and hence its use as a congestion signalling method for a wireless network as proposed herein allows for seamless integration of the wireless network with any fixed network to which the wireless network may be connected.

Preferably, the wireless resources comprise any one or more of a transmission rate; a transmission bit-energy to noise spectral density ratio; base station transmission power; and/or user terminal battery power. In this way the user utility function and the price per unit resource can be expressed in actual scarce physical resources provided by the wireless network, resulting in technically meaningful resource allocation.

In a preferred embodiment the wireless network and user terminals are operable to perform code division multiple access (CDMA), and wherein for a rate-elastic uplink the user utility function is given by:

$$U = U(r \cdot P_s(\gamma)) - \lambda r \gamma$$

wherein:
U is the user utility value;
U(x) is the user utility function;
r is the transmission rate;
γ is the transmission bit-energy to noise spectral density ratio;
Ps(γ) is the probability of a bit being received successfully with respect to γ; and
λ is the price per unit of wireless resource (rγ).

In another embodiment for loss-sensitive traffic the user utility function for the uplink is given by:

$$U = U_i(r_i P_s(\gamma_i)) - V_i((r_i(1 - P_s(\gamma_i))) - \lambda r_i \gamma_i$$

wherein:
U is the user utility value;
U(x) is the user utility function;
r is the transmission rate;

γ is the transmission bit-energy to noise spectral density ratio;
Ps(γ) is the probability of a bit being received successfully with respect to γ;
λ is the price per unit of wireless resource (rγ); and
V(x) is a decreasing concave function taking values in [0,1].

Within the embodiments the calculating step (c) further comprises the steps of:

receiving indication of a target optimal γ* such that the number of bits successfully transmitted over the uplink per unit of energy is maximised; and using the received optimal value γ* and the received price per unit of wireless resource rγ as inputs, calculating the transmission rate rγ at which the user utility value U is maximised.

The ability to calculate the optimal Eb/No value separately from the transmission rate r greatly simplifies the user's price reaction process by decoupling the two problems: the selection of the target signal quality and the selection of the transmission rate; this decoupling enables the integration of the congestion loop at the CDMA layer (Note: herein we will use the term "CDMA layer" to refer to all the layer of a CDMA network below the data link layer) with that at the transport layer. Moreover, the selection of optimal Eb/No needs to be performed at the start of data transmission, or whenever the dependence of the packet error probability on Eb/No changes.

Furthermore, within the preferred embodiment for a rate elastic downlink the user utility function is given by:

$$U = U(r \cdot P_s(\gamma)) - \lambda p$$

wherein:
U is the user utility value;
U(x) is the user utility function;
r is the transmission rate;
γ is the transmission bit-energy to noise spectral density ratio;
Ps(γ) is the probability of a bit being received successfully with respect to γ;
p is the transmission power of the network to the user terminal; and
λ is the price per unit of power (p).

Alternatively, in another embodiment dealing with loss-sensitive traffic the downlink utility function is given by:

$$U = U_i(r_i P_s(\gamma_i)) - V_i(r_i(1 - P_s(\gamma_i))) - \lambda p_i$$

wherein:
U is the user utility value;
U(x) is the user utility function;
r is the transmission rate;
γ is the transmission bit-energy to noise spectral density ratio;
Ps(γ) is the probability of a bit being received successfully with respect to γ;
p is the transmission power of the network to the user terminal;
λ is the price per unit of power (p); and
V(x) is a decreasing concave function taking values in [0,1].

Moreover, within the embodiments the calculating step (c) further comprises the steps of: selecting a target optimal γ* such that the number of bits successfully transmitted over the downlink per unit of energy is maximised; and using the selected optimal value γ* and the received price per unit of power p as inputs, calculating the transmission rate r at which the user utility value U is maximised; and signalling the calculated transmission rate r to the network controller as the rate of wireless resource usage. This separation of the calculation of the optimal bit transmission energy and the transmission rate simplifies matters in the same manner as described earlier.

Furthermore, preferably the user utility function further incorporates a function of price per unit of bandwidth in a fixed network to which said wireless network is linked. This further increases the seamless integration of the wired and wireless networks, as mobile users can also take into account the price of bandwidth in the fixed network.

Finally, preferably the user utility function further incorporates a function of cost per unit of user terminal battery power, and a measure of user terminal battery power. This allows the user to take into account the cost of mobile battery power, thus further refining the user utility function.

The first aspect of the invention deals with those method steps which a user terminal may perform in accordance with the present invention. The present invention also requires the actual network operation to be modified, however, and hence from a second aspect the present invention also provides a method of operating a wireless network comprising one or more base stations controlled by a network controller, the network being operable to communicate with one or more remote user terminals via the base stations, the method comprising the steps of:

monitoring a data traffic load on the network;
calculating a price value per unit of wireless resource usage as a function of the monitored data traffic load; and
signalling the calculated price value to the or each user terminal.

The second aspect provides the advantage that the price is set as a direct function of the monitored load, and hence is directly indicative of the present level of wireless resource usage and congestion.

Preferably, the signalling step further comprises the steps of transmitting data packets to the or each user terminal, and setting one or more explicit congestion notification (ECN) bits in a sub-set of the transmitted packets prior to transmission;

wherein the proportion of transmitted packets whose ECN field is set is indicative of the calculated price value.

As in the first aspect, the use the ECN bits to relay congestion control information in the form of pricing information provides for seamless resource control between the wireless and any fixed networks.

In the preferred embodiment, when the transmitted packets relate to an uplink from one of the user terminals to the network, a probability of a particular packet's ECN bits being set is a function of at least the monitored data traffic load on the network, and a transmission bit-energy to noise spectral density ratio of the uplink. Furthermore, when the transmitted packets relate to a downlink from the network to one of the user terminals, a probability of a particular packet's ECN bits being set is a function of at least the monitored data traffic load on the network, and a transmission power value. Moreover, the setting of a packet's ECN bit or bits is preferably performed by the network controller. These features allow for the ECN feedback to reflect the usage of shared resources in the wireless network, in addition to the usage of resources in the fixed network.

In addition to the above, the second aspect of the present invention also presents the corresponding additional features and advantages to the first aspect as described above.

From a third aspect, the present invention also presents a user terminal comprising means operable to perform in accordance with the first aspect of the invention.

From a fourth aspect, the present invention also provides a wireless network comprising one or more base stations and a network controller arranged to control said base stations and being further operable to perform the method of the second aspect of the invention.

From a fifth aspect, the present invention further provides a computer-readable storage medium storing a program which when run on a computer controls the computer to perform the method of either one of the first aspect or the second aspect of the invention.

In addition to the above, in order to specifically address the above mentioned problem of seamless internetworking and signalling, in the present invention we propose to use ECN marking as the signalling mechanism to provide congestion feedback for wireless resources. In particular the communication of the price per unit of wireless resource to the mobile user terminals is performed at the radio network controller by setting an appropriate proportion of explicit congestion notification (ECN) bits. In this way the congestion control is seamlessly integrated between the wireless and fixed networks, as the mobile users simply see the ECN marks without knowing whether the congestion present is in the wireless or the wired network.

In view of the above, from a further sixth aspect the present invention provides a method of congestion control signalling for use in a wireless network, the method comprising the steps of: transmitting data packets to one or more user terminal over a wireless communications link; and setting one or more explicit congestion notification (ECN) bits in a sub-set of the transmitted packets prior to transmission;

wherein the proportion of transmitted packets whose ECN bit or bits is set is indicative of a congestion charge to be made for use by the or each user terminal of one or more wireless resources.

The use of the ECN bit for congestion control has recently been proposed as a standard for fixed networks (see RFC 3168 at www.ietf.org), and hence its use as a congestion signalling method for a wireless network as proposed herein allows for seamless integration of the wireless network with any fixed network to which the wireless network may be connected. Furthermore the invention allows for the ECN feedback to reflect the usage of the shared wireless resources in the wireless network, in addition to the usage of resources in the fixed network.

Preferably, the setting step further comprises the steps of monitoring the data traffic load in the wireless network; and selecting an ECN setting probability as a function of the monitored data traffic load; wherein the function is arranged such that the ECN setting probability increases as the monitored data traffic load increases. This ensures that the ECN marks set or added to the packets are indicative of the actual network loading.

Moreover, preferably a first function is used to select the ECN setting probability for ECN bits which indicate the congestion charge for use of the one or more wireless resources for the transmission of data from the one or more user terminals, and a second function is used to select the ECN setting probability for ECN bits which indicate the congestion charge for use of the one or more wireless resources for the transmission of data to the one or more user terminals. Such provision allow the uplink and downlink from/to the user terminals from a network base station to be treated separately, and respective congestion charges can be set for one direction independent of the traffic load in the other.

In a preferred embodiment, the wireless network is a CDMA network, and the first function is a function of at least the monitored data traffic load on the network, and a transmission bit-energy to noise spectral density ratio of the data transmitted from the one or more user terminals.

Furthermore, within the preferred embodiment the second function is preferably a function of at least the monitored data traffic load on the network, and a transmission power value of the data transmitted to the one or more user terminals.

Preferably, in any of the embodiments the setting of a packet's ECN bit or bits is performed by a radio network controller (RNC) provided to control the wireless network From another aspect the invention also provides a computer-readable storage medium storing a program which when run on a computer controls the computer to perform the method of the invention according to the sixth aspect substantially as described herein.

BRIEF DESCRIPTION OF THE DRAWINGS

FIG. 3($b$) illustrates a typical user utility function for rate-elastic traffic with a minimum rate;

DETAILED DESCRIPTION OF EXEMPLARY EMBODIMENTS

Note that in the following description within the text a LaTex™ style notation has been used in some places to represent symbols which are present in the various equations. Such a representation replaces Greek symbols as represented within equations with their corresponding names within the text. Moreover, any text present after an underscore (_) is treated as sub-script. Thus, as an example, the representation lambda_i in the text will appear as $\lambda\_i$ in any equation. Where there is doubt over the correspondence of a variable name within the text and its representation within an equation, the reader is directed to consult a person skilled in those versions of LaTex commonly available at the priority date.

Congestion pricing has been identified as a flexible mechanism for efficient and robust resource control in fixed wireline networks. In the preferred embodiments of the present invention we investigate the application of congestion pricing in wireless WCDMA (Wideband Code Division Multiple Access, CDMA) networks.

Figure 1:
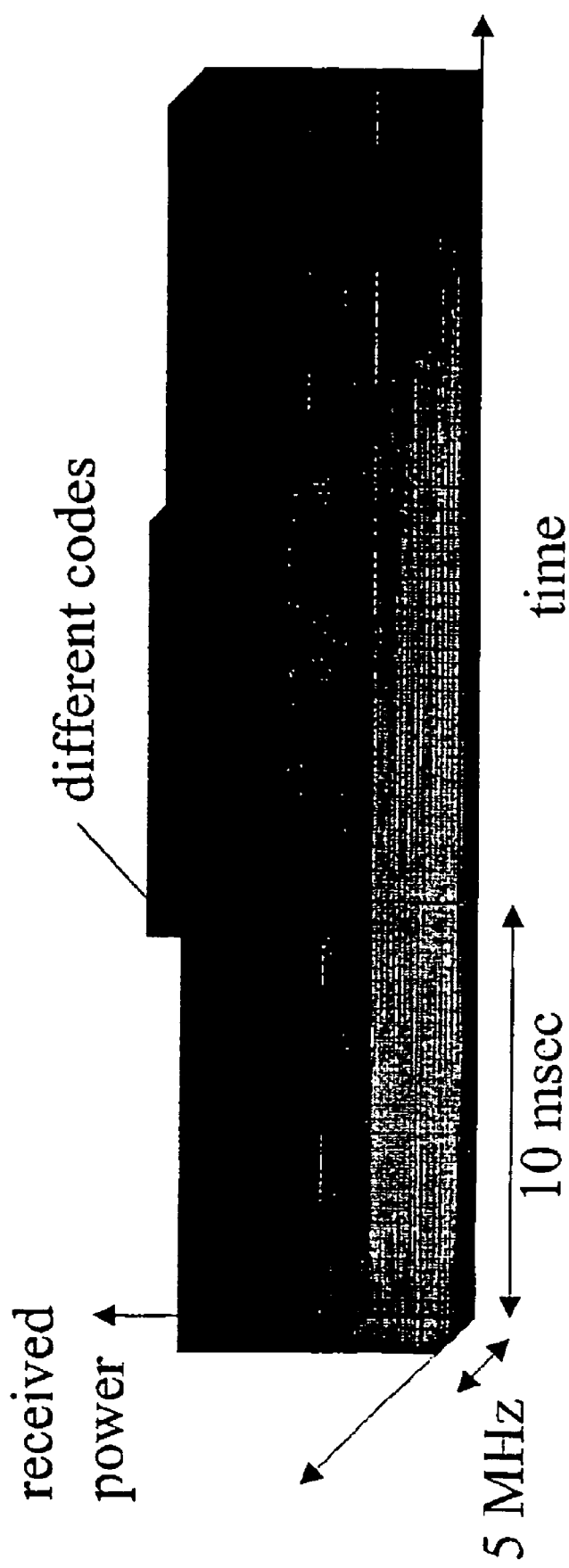
FIG. 1 is a graph showing the operation of a typical CDMA system.

WCDMA has emerged as the most widely adopted third generation (3G) air interface technology. With FDMA (Frequency Division Multiple Access) each mobile uses a difference portion of the radio spectrum, and with TDMA (Time Division Multiple Access) each mobile can use the shared radio resource only in the time slots it has been allocated. On the other hand, with CDMA all mobile hosts can simultaneously use the whole radio spectrum, and unique digital codes are used to differentiate the signal from different mobiles; such an approach enables simpler statistical multiplexing, without the need for complex time or frequency scheduling mechanisms. WCDMA is based on Direct Sequence CDMA (DS-CDMA), a spread spectrum technology where the user data bits are spread over the entire spectrum used for transmission. The concept of WCDMA is shown in FIG. 1, wherein it will be seen that the use of different spreading codes allows a user to transmit across the entire available bandwidth, (which for WCDMA is approximately 5 MHz in each direction (this is the case for WCDMA's Frequency Division Duplex (FDD) mode—in the Time Division Duplex (TDD) mode it uses a single 5 MHz band for both directions (uplink and downlink))) but it is only by application of the appropriate de-spreading code at the receiver that the original spread signal is received. The operating concepts of DS-CDMA are well known in the art, and no further details need be given herein.

An important advantage of WCDMA, however, is the support for variable bit rates, that is achieved with the use of variable spreading factors and multiple codes. Finally, all the cells in a WCDMA network use the same frequency spectrum; this feature is behind the soft-capacity property of WCDMA networks, which results in the graceful degradation of performance as the load increases.

Note that although the present invention is focused on WCDMA, including its code and time division scheduling modes, our results and the present invention are more generally applicable to both CDMA-based and other wireless systems.

Prior to describing the operation of the embodiments of the invention, a discussion of the theoretical background of the invention in the context of a CDMA network will first be undertaken.

Theoretical Background

In this section we investigate resource usage for the uplink and downlink in CDMA networks, identifying the key parameters that affect resource usage in each direction. The investigations into resource usage thus obtained is then applied within the specific embodiments of the present invention.

Consider a single CDMA cell. Let W be the chip rate, which is fixed and equal to 3.84 Mcps for WCDMA. The bit-energy-to-noise-density ratio, (a note regarding terminology: The term signal-to-interference-plus-noise (or simply signal-to-interference) ratio SINR (or SIR) is sometimes used for what we defined as E_b/N_O; however, this is not universal, since SINR can also be taken to be (r/w*Eb/No) i.e., the carrier signal to interference ratio. E_b/N_O, at a receiver (either the mobile host or the base station)) is given, in the case of matched filter receivers, by:

$$\left(\frac{Eb}{No}\right)_i = \frac{W}{r_i} \frac{g_i p_i}{I_i + \eta_i} \quad (1)$$

where r_i is the transmission rate, p_i is the transmission power, g_i is the path gain between the base station and mobile i, I_i is the power of the interference, and eta_i is the power of the background noise. The path gain depends on channel imperfections such as attenuation, shadowing, and multi-path fading.

The value of the bit-energy-to-noise-density ratio (E_b/N_O)_i corresponds to the signal quality, since it determines the bit error rate (BER). Due to the errors in the wireless network, the actual throughput, i.e., rate of successful data delivery, will be smaller than r_i. Under the realistic assumption of additive white Gaussian noise, BER is a non-decreasing function of E_b/N_O that depends on the multi-path characteristics, and the modulation and forward error correction (FEC) algorithms. Let gamma_i be the target bit-energy-to-noise-density ratio required to achieve a target (the target signal quality can also be expressed in terms of the block error rate, BLER, or the frame error rate, FER. In practise up to now, the target signal quality is set the same for all users. Nevertheless, it has been identified that differentiated service can be offered by setting a different target for different users. This target is given to fast closed-loop power control (WCDMA supports fast (1500 Hz) closed-loop power control in both the uplink and the downlink. On the other hand, IS-95, a second generation narrowband CDMA system, supports fast (800 Hz) closed-loop power control only in the uplink), which adjusts the transmission power in order to achieve it. If we assume perfect power control, then (E_b/N_O)_i= gamma_i.

The ratio W/r_i is the spreading factor or processing gain for mobile i From (1) we observe that for a higher spreading factor, equivalently a smaller transmission rate, the same target E_b/N_O will be achieved with less power. Variable bit rate transmission can be supported with codes corresponding to different spreading factors, while keeping the chip rate the same, and with the use of multiple codes. In WCDMA transmission occurs in frames with a minimum duration of 10 milliseconds; the rate is allowed to change between frames, but remains the same within a single frame.

The spreading factor on the uplink dedicated channel are powers of 2 and can range from 256, giving a channel bit rate (Note: The maximum user data rate with ½ rate coding is approximately half the channel bit rate) of 15 Kbps, to 4, giving a channel bit rate of 960 Kbps; higher bit rates are achieved by using up to 6 parallel codes with spreading factor 4 (giving a channel bit rate of 5740 Kbps). In the downlink, the spreading factor can range from 512 to 4. Moreover, in the downlink, orthogonal codes are selected according to the maximum transmission rate.

When a sender does not send data continuously, the average E_b/N_O requirements will be met, if the right hand-side of (1) is multiplied by the percentage of time the sender is 'on', i.e., actually transmitting data; this percentage is called activity factor, and for voice is 0.67.

Uplink

In the uplink, the interference I_i for mobile i is the sum of the power of the signals received by the base station from all other mobile hosts within the same cell, i.e., $$I_i = \sum_{j \neq i} g_j p_j.$$

Moreover, we can assume that the background noise at the base station is the same for all mobiles, i.e., eta_i=eta. If gamma_i is the target bit-energy-to-noise-density ratio, then under perfect power control (E_b/N_O)_i=gamma_, and (1) becomes (2):

$$\gamma_i = \frac{W}{r_i} \frac{g_i p_i}{\sum_{j \neq i} g_j p_j + \eta}$$

Solving the set of equations given by (2) for each mobile i, we get $$g_i p_i = \frac{\eta \alpha_i^{UL}}{1 - \sum_j \alpha_j^{UL}} \quad (3)$$

where the load factor is given by:

$$\alpha_i^{UL} = \frac{1}{\left(\frac{W}{r_i \gamma_i} + 1\right)} \quad (4)$$

Note that the power levels given by the set of equations (3) for i is a member of I, where I is the set of mobiles, are the minimum such that the target bit-energy-to-noise-density ratios gamma_i are met. Since the power p_i can take only positive values, from (3) we get:

$$\Sigma \alpha_i^{UL} < 1 \quad (5)$$

The sum in (5) is called uplink load factor. Moreover, (5) illustrates that the uplink is interference-limited: Even when they have no power constraints, mobile hosts can not increase their power with no bound, due to the increased interference they cause to the other mobiles. If (5) is violated, then the target gamma_i can not be met for all mobiles, and the system is infeasible.

Moreover, (5) suggests that the load factor is a measure of the resource usage or the "effective usage" of a mobile host i, in the uplink direction. Observe from (4) that resource usage in CDMA networks is determined by two parameters, which can be controlled independently: the transmission rate r_i and the signal quality, expressed in terms of the target bit-energy-to-noise-density ratio gamma_i; moreover, resource usage is an increasing function of the product of r_i and gamma_i. The above result was for the case of linear single user (matched filter) receivers; expressions for resource usage can also be defined for multi-user receivers.

A useful expression for measuring the uplink load factor can be found by summing (3) for all mobiles:

$$\sum_i \alpha_i^{UL} = \frac{I_{TOTAL} - \eta}{I_{TOTAL}} \quad (6)$$

where I_total is the total received power, including the noise power. Hence, estimation of the uplink load factor requires measurements of the total interference and the noise, both of which can be performed at the base station.

When there are a large number of mobile users, each using a small portion of the available resources, we have $$\frac{W}{r_i \gamma_i} \gg 1,$$

hence $$\alpha_i^{UL} \approx \frac{r_i \gamma_i}{W}$$

and the resource constraint (5) can be approximated by:—

$$\sum_i r_i \gamma_i \langle W \quad (7)$$

Up to now we have assumed that there are no constraints on the power a mobile can transmit. In the case there are such power constraints, namely p_i for mobile i, then from (3) we get:—

$$\sum_i \alpha_i^{UL} \leq 1 - \frac{\eta}{\min_i \left[\frac{g_i p_i}{\alpha_i^{UL}}\right]} \quad (8)$$

Hence, when there are power constraints, the total capacity is determined by one mobile host. Indeed, if all mobiles have the same power constraint and the same resource usage, then the total capacity is determined by the mobile with the smallest channel gain g_i, equivalently the highest channel loss. Since loss is related to the distance from the base station, the uplink in this case is coverage-limited. Hence, from the above we see that the coverage of a CDMA cell is determined by the constraint on the uplink load factor: a smaller constraint results in a larger coverage. In radio network planning this constraint is expressed in terms of the interference margin or noise rise, I_margin, which is given by the ratio of the total received power (including the noise) divided by the noise power:

$$I_{margin} = \frac{I_{total}}{\eta},$$

in which case the constraint on the total load becomes $$\sum_i \alpha_i^{UL} \le \frac{I_{margin}-1}{I_{margin}} \quad (5)$$

The above model can be extended to the case where we have two (or more) traffic classes, e.g., real-time and non real-time, for which there is a bound on the percentage of the capacity used by one class (e.g., non real-time) or the total power of the signals received at the base station from one traffic class, thus limiting the interference that this class causes to the other (e.g., real-time).

Downlink

In the downlink, the total interference for mobile i is given by $$I_i = \theta_i g_i \sum_{j \ne i} p_j,$$

where theta_i represents the orthogonality of the codes used in the downlink (WCDMA employs orthogonal codes in the downlink. Due to multi-path propagation, however, the mobile will receive part of the base station signal as multi-access interference. On the other hand, multi-path propagation can increase the power of the received signal. Which of the two effect is larger depends on the distance of the mobile from the base station, and its speed. In the uplink, transmission is asynchronous, hence the signals are not orthogonal), g_i is the channel gain from the base station to mobile i, and p_j is the transmission power to mobile j. If gamma_i is the target signal quality for mobile i, and assuming, as in the previous sections, that we have perfect power control, then (1) becomes:

$$\gamma_i = \frac{W}{r_i} \frac{g_i p_i}{\theta_i g_i \sum_{j \ne i} p_j + \eta} \quad (9)$$

The orthogonality factor theta_i depends on multi-path effects, hence can be different for different mobile hosts. Typical values fall in the range [0.1,0.6].

In the downlink, unlike the uplink, there is a limit on the total transmission power (here the total transmission power here refers to the total power the base station can transmit minus the power used for the downlink control channels), say P, hence the downlink is power-limited. The corresponding resource constraint is given by:

$$\sum_i p_i \le P \quad (10)$$

The last equation suggests that the transmission power from the base station characterizes resource usage in the downlink direction.

Next we derive the expression for the total power constraint in terms of r_i, gamma_i. From (9) we get:

$$p_i = \alpha_i \sum_j p_j + \alpha_i \eta_i' \quad (11)$$

where we have substituted $$\eta_i' = \frac{\eta_i}{\theta_i g_i} \text{ and } \alpha_i = \frac{1}{\frac{W}{r_i \gamma_i \theta_i}+1}.$$

Summing (11) for all mobiles gives:

$$\sum_i p_i = \frac{\sum_i (\alpha_i \eta_i')}{1-\sum_i \alpha_i} \quad (12)$$

Observe in the last equation that as the sum of alpha_i approaches 1, the total power required at the base station tends to infinity.

From (10) and (12) we have:

$$\sum_i \left[\alpha_i \left(\frac{\eta_i'}{P}+1\right)\right] \le 1 \quad (13)$$

Equation (13) suggests that resource usage in the downlink direction can be expressed in terms of the rate r_i and target bit-energy-to-noise-density ratio gamma_i by:

$$\alpha_i^{DL} = \alpha_i \left(\frac{\eta_i'}{P}+1\right) = \frac{\frac{\eta_i}{\theta_i g_i P}+1}{\frac{W}{r_i \gamma_i \theta_i}+1} \quad (14)$$

Unlike the uplink, where resource usage is given by (4), resource usage in the downlink is not independent of the path gain, hence of the mobile's position.

DESCRIPTION OF THE EMBODIMENTS

Having described the theoretical background to the present invention, preferred embodiments thereof will now be described which build thereon.

The present invention is aimed at allowing for efficient allocation of scarce wireless resources such as transmission bandwidth (transmission rate), bit energy, transmission power, battery power and the like, by the application of micro-economic principles of supply and demand. Put simply, the invention is aimed at wireless resource allocation by virtue of the setting of a price for that resource based on the supply thereof and the demand therefore, which are both measured by monitoring the data traffic load on the wireless network. In addition to the above, the invention is also concerned with seamless control signalling in such a method, which has practical advantages for the seamless inter-working of different types of network.

Whilst a detailed description of each embodiment of the invention will be undertaken later, the operation of the embodiments of the invention can be summarised as follows with reference to FIG. 2(a) and (b) and FIGS. 7 and 8.

Each mobile handset 20 contains a computer readable storage medium such as a solid state memory which stores a user utility function which expresses a user utility value U for the handset as a function of one or more scarce wireless resources, and the price per unit of using those wireless resources. Based on the presently monitored network loading, a radio network controller (RNC) 24 which controls the wireless network (which itself consists of one or more base stations 22 which physically communicate with the mobile handsets 20 via radio links) sets a price for the use by the mobile handsets of the wireless network's actual physical resources, and this is communicated to each of the mobile handsets 20. The price setting may be performed using a function of price against network loading as shown in FIG. 7. Using this information each mobile handset then calculates its own rate of wireless network resource usage based on its own user utility function such that the utility value U for the handset is maximised.

Figure 2:
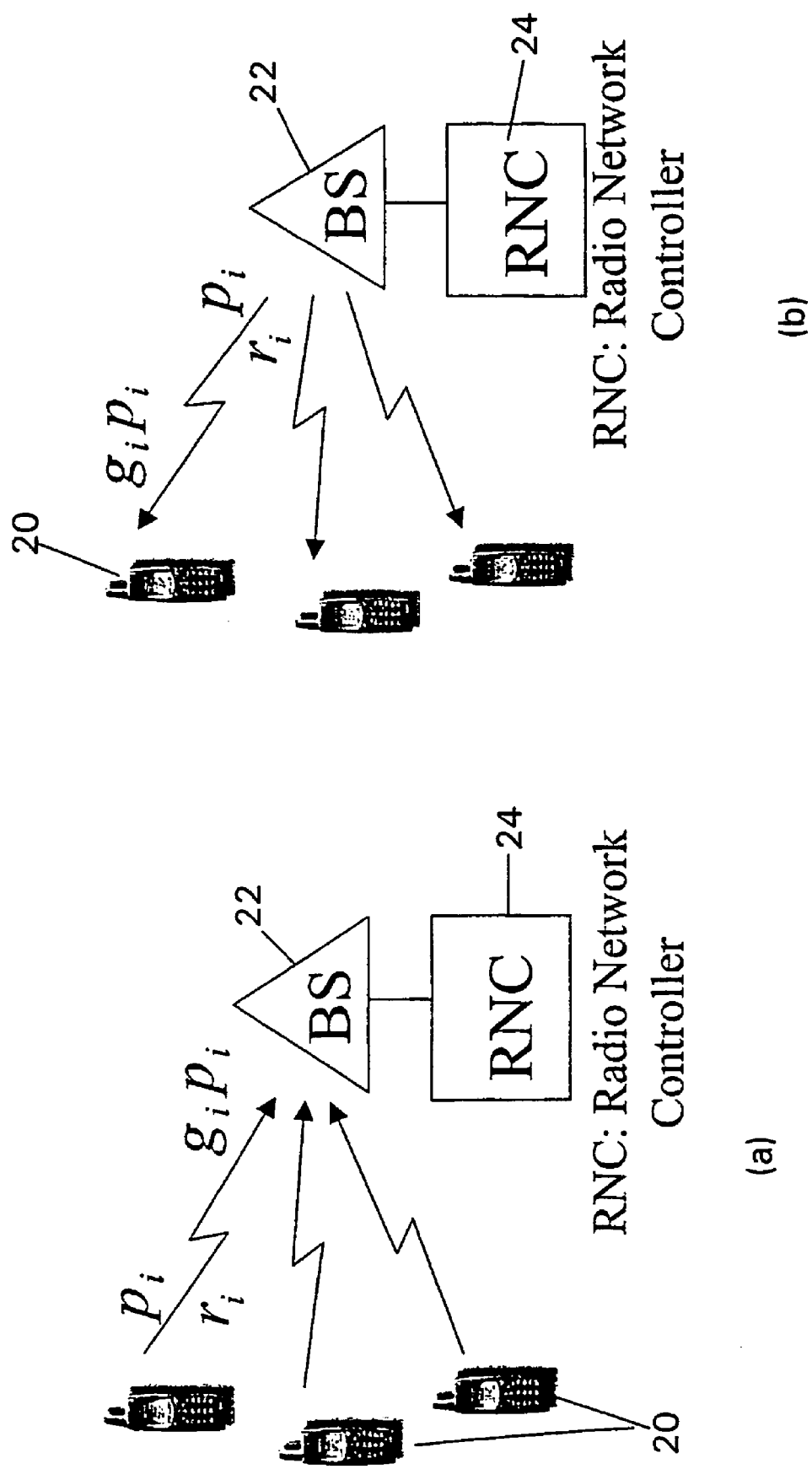
FIG. 2($a$) and ($b$) respectively illustrate the hardware elements which are required for the operation of the present invention.

In the case of an uplink to the network as shown in FIG. 2(*a*), the handset then transmits at a rate and with a transmission power such that the wireless resources are used at the calculated rate, and the radio network controller charges the handset by the product of the announced price and the wireless resource usage rate.

Figure 8:
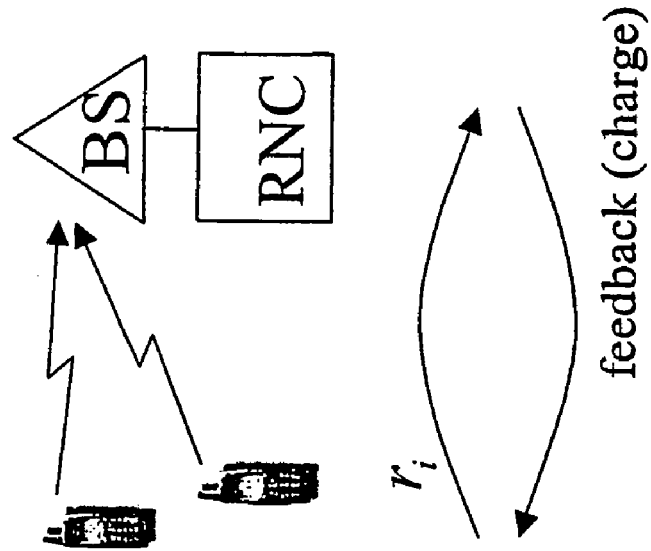
FIG. 8 illustrates the control signalling flows in the preferred embodiment of the present invention.

In the case of a downlink from the network to a handset as shown in FIG. 2(*b*) the handset must first signal its calculated rate of wireless resource usage to the network, as shown in FIG. 8, which then transmits to the handset at a transmission rate and with a transmission power to use the scarce wireless resources at the signalled rate, and again the RNC charges the handset with the product of the announced price and the wireless resource usage rate.

In either case, the RNC periodically monitors the present network load and signals changes in price of each wireless resource as appropriate, whereupon the handsets can then re-calculate their resource usage rates and signal or transmit load data as appropriate.

It will be apparent from the above that the key to the operation of the present invention is the definition and maximisation of the user utility function which gives the user utility value U. We have found that for CDMA wireless networks no single user utility function is optimal for both up and down links, nor for different types of traffic. In particular, in the embodiments to be described next we use a different optimal user utility function for each of the up and down links for both rate-elastic and for rate-inelastic traffic. We then describe how price signalling can be performed using ECN marks. Finally, we present additional embodiments which deal with loss-sensitive traffic, and the fact that within WCDMA it is possible only to vary the transmission rate in discrete steps.

Rate Elastic Traffic

In the case of elastic (best-effort) traffic, users value the average throughput with which their data is successfully transmitted. The throughput is a product of the transmission rate and the probability of successful packet transmission. The latter is a function of the bit error rate BER, which as discussed in the theoretical background is a function of the target bit-energy-to-noise-density ratio gamma. Hence, the probability of successful packet (Packet here refers to the data unit over which error detection is performed) transmission can be written as Ps(gamma), in which case the average throughput is rPs(gamma). Thus, the utility for elastic traffic users that do not value packet delays has the form U(rPs (gamma)). If the mobile user does not have minimum rate requirements, then the utility is typically concave, as shown in FIG. 3(*a*).

Figure 3:
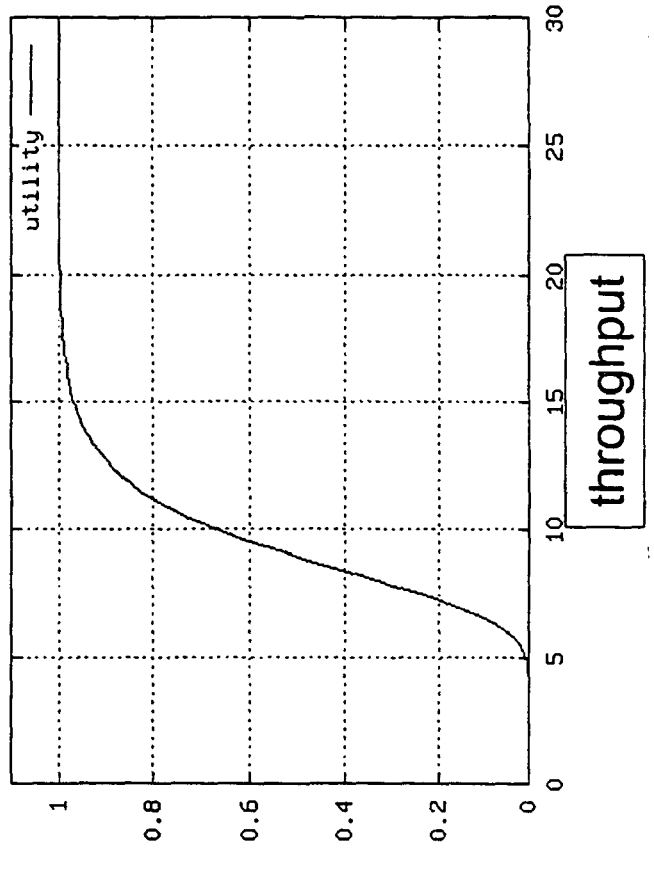
FIG. 3($a$) illustrates a typical user utility function for rate-elastic traffic with no minimum rate.
Figure 3:
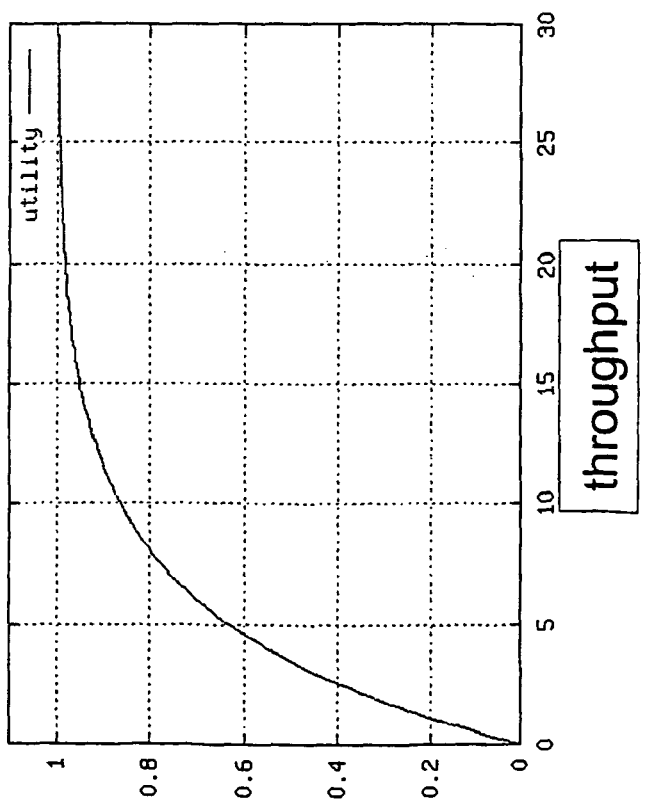

On the other hand, in the case the user has minimum rate requirements, equivalently maximum delay requirements, the utility can have a sigmoid shape, as shown in FIG. 3(*b*).

Figure 4:
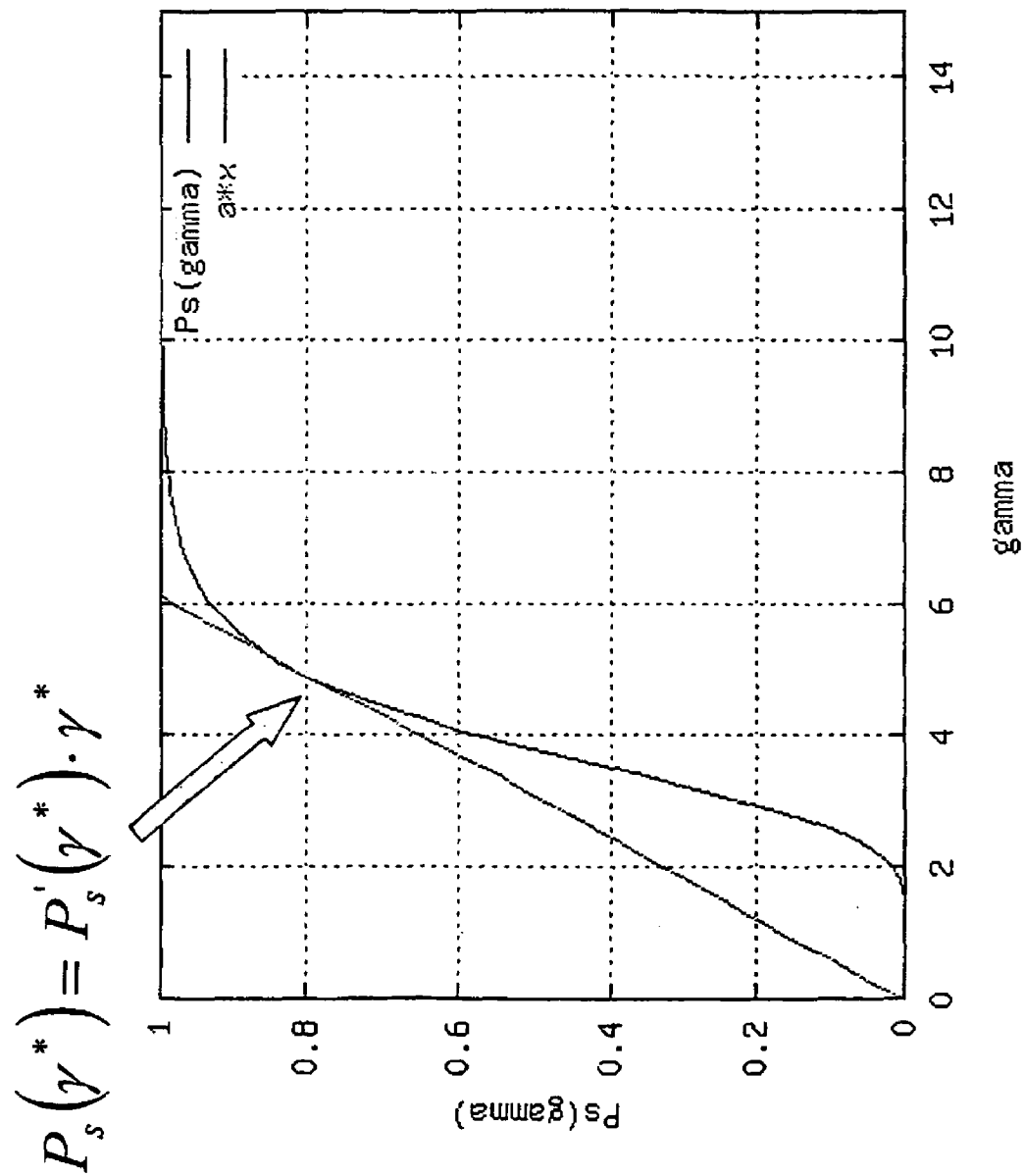
FIG. 4 illustrates a plot of the probability of a bit being received successfully over a communications link with respect to the ratio of bit-energy to noise-spectral density (Eb/No) for DPSK modulation.
Figure 6:
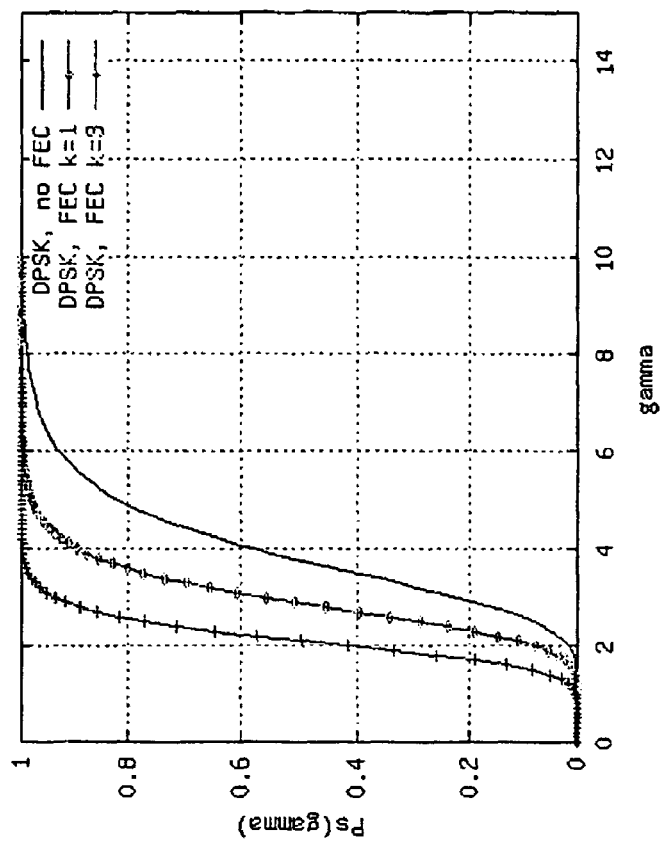
FIG. 6 illustrates a further plot of the probability of a bit being received successfully over a communications link with respect to the ratio of bit-energy to noise-spectral density (Eb/No) for different forward error correction (FEC) capabilities.
Figure 5:
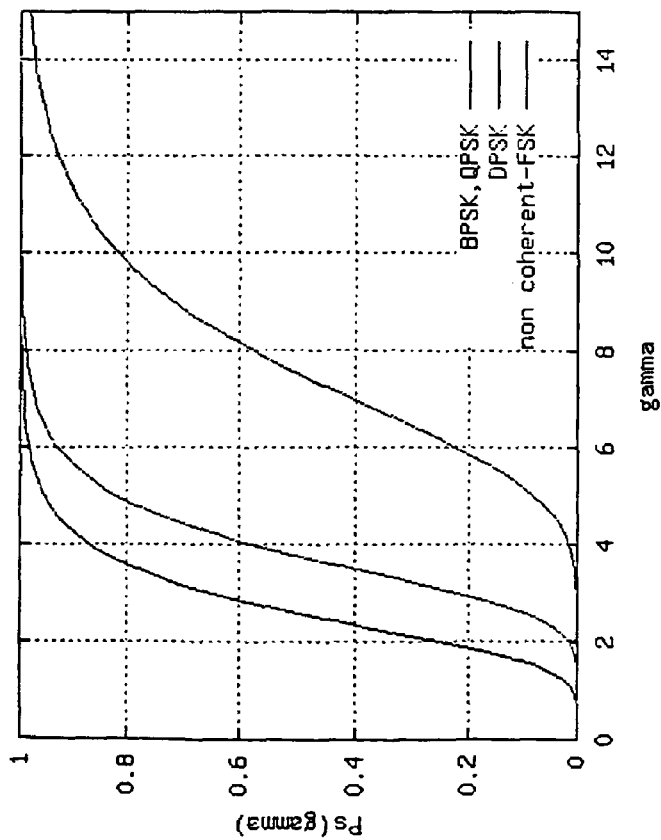
FIG. 5 illustrates another plot of the probability of a bit being received successfully over a communications link with respect to the ratio of bit-energy to noise-spectral density (Eb/No) for other types of modulation.

Note that the packet success probability Ps(gamma), in addition to the modulation and error correction algorithms, depends on a path's multi-path characteristics, hence can be different for different mobiles. FIG. 4 illustrates a plot of Ps(gamma) against gamma for DPSK modulation, whereas FIGS. 5 and 6 illustrate Ps(gamma) for other forms of modulation and different forward error correction capabilities.

In the first embodiment, let $c(r\_i, \text{gamma}\_i, p\_i)$ be the charge incurred by user i with rate $r\_i$, target bit-energy-to-noise-density ratio gamma_i, and transmission power $p\_i$. The net utility maximization problem for the user then has the following general form (unless otherwise noted, we assume that the packet success probability Ps(gamma) is the same for all users):

$$\text{maximise } U_i(r_i P_s(\gamma_i)) - c(r_i, \gamma_i, p_i)$$

$$\text{over } r\_i \geq 0, \text{gamma}\_i \geq 0 \quad (15)$$

where the variables $r\_i$, gamma_i, $p\_i$ are related by (2) and (9)

The charge $c(r\_i, \text{gamma}\_i, p\_i)$ can include both the congestion charge for shared resources in the wireless network and, as we will see later, the congestion charge for resources in the wireline network and the cost of battery power at the mobile (in the uplink direction). Specific formulations for the uplink and downlink utility function, based on the results of the theoretical background regarding resource usage in each direction, will be discussed later.

The optimisation in (15) involves two parameters: the rate $r\_i$ and the target bit-energy-to-noise-density ratio gamma_i. We have proved the following important result for the uplink, which also holds for more general forms of the charge function $c()$: under certain assumptions for the utility function, the user optimisation can be decomposed into two sub-problems: one involving the selection of the optimal gamma, which depends only on the packet success probability Ps(gamma), and one involving the selection of the optimal rate r, which depends on the user's utility and his charge.

Note that it is mathematically equivalent to perform the optimisation of (15) over any of the two variables $r\_i$, gamma_i, and $p\_i$. In WCDMA networks, however, due to multipath fading and mobility, the power to achieve a target bit-energy-to-noise-density ratio can vary significantly. Fast closed-loop power control between the base station and the mobile adjusts the transmission power to achieve the target gamma_i. In this embodiment we assume that the adaptation of the rate and signal quality occurs at a slower timescale compared to fast closed-loop power control.

We will consider now the utility function for the uplink for rate inelastic traffic. In the uplink from (7) previously we found that the wireless resource constraint was a function of the product of the transmission rate $r\_i$ for a particular mobile handset, and the transmission bit energy to noise spectral density ratio gamma_i. Therefore in order to provide the right incentives for efficient usage of network resources, user i's charge should be proportional to his resource usage, which is given by the product $r\_i * \text{gamma}\_i$. Hence, in the uplink the user optimisation problem becomes:

$$\text{maximise } U_i(r_i P_s(\gamma_i)) - \lambda r_i \gamma_i$$

$$\text{over } r\_i \geq 0, \text{gamma}\_i \geq 0 \quad (16)$$

where lambda is the shadow price for resource $r\_i$ gamma_i. For simplicity, we assume that the packet success rate function Ps(gamma) is the same for all users.

The network can adjust the price lambda based on measurements of load. If the price is adjusted up (or down) depending on whether the demand is larger (or less) than the available capacity, then the social welfare of the system (mobile users and wireless network), take to be the sum of all user utilities, is maximized.

Note that in the above model prices do not depend on the position of the mobile. This is because the uplink is interference-limited, and interference depends on the received power of the signal at the base station. On the other hand, with the approaches in the prior art where charges depend on the transmitted power, mobile users that are far from the base station incur a higher charge, for the same rate and signal quality, compared to users that are close to the base station. Moreover, in the downlink, as we will see later, a mobile user's position influences his charge, since resource usage in this case is determined by the transmitted power at the base station.

The problem, then, in the uplink is for a user to find the rate of resource usage of r_i, gamma_i, which maximises (16). Importantly, we have proved an important property which greatly simplifies the application of (16): the optimal gamma^*_i of the target bit-energy-to-noise-density ratio is independent of the price lambda and of the user's utility. This allows the decoupling of the two problems of selecting the optimal gamma^*_i and of adjusting the transmission rate r_i.

More particularly, it can be shown that the optimal value of gamma_i (gamma^*_i) satisfies the following:

$$Ps(\text{gamma}^*\_i) = Ps'(\text{gamma}^*\_i)\text{gamma}^*\_i \quad (17)$$

Furthermore, when this condition is met the number of bits successfully received per unit of received energy is maximised. The solution can be solved for mathematically, and also graphically, being the value of gamma at which a straight line passing through the origin is at a tangent to a plot of Ps(gamma). This is shown graphically in FIG. 4.

Thus, by being able to find the optimal value of gamma_i (gamma^*_i) solely from Ps(gamma_i) the user utility problem for the uplink is reduced to:

$$\text{maximise } U_i(r_i P_s(\gamma_i^*)) - \lambda r_i \gamma_i^*$$

$$\text{over } r\_i >= 0 \quad (18)$$

Figure 7:
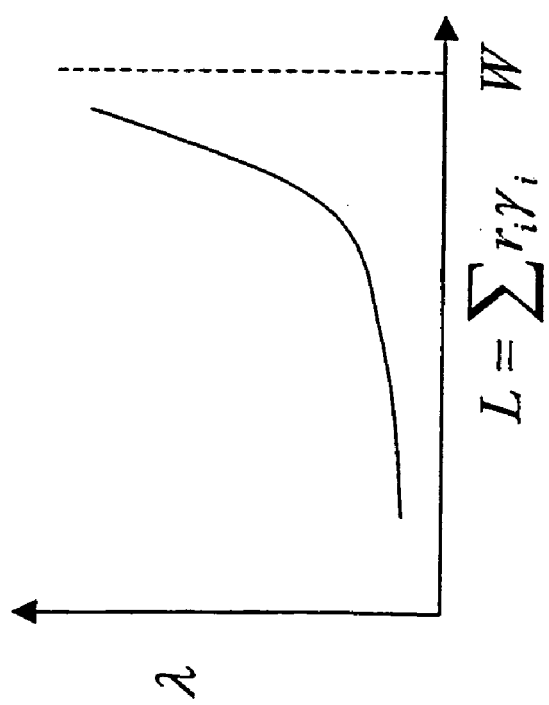
FIG. 7 is a graph of a price versus load function which may be used in the present invention.

In view of the above findings, the method steps for resource control for the uplink in the first embodiment are as shown in FIG. 7, and described next.

Firstly, at step 9.1 the RNC 24 selects the optimal gamma^*_i which satisfies (17) above. In WCDMA, the procedure for selecting gamma (target E_b/N_O) is performed at the RNC, during outer loop power control: The BS measures the bit error rate BER (or the frame error rate FER), and sends the measurement to the RNC, which adjusts gamma to achieve a target BER; gamma is then used as the target for fast closed-loop power control, which operates between the base station and the mobiles. Hence, it is appropriate to perform the selection of the optimal gamma^* in Step 9.1 at the RNC, effectively replacing the normal outer loop power control procedure.

A sample algorithm for setting gamma^*, which takes into account the sigmoid shape of the packet success probability, is as follows:—

---

WHILE TRUE $$\text{IF } \frac{Ps(k) - Ps(k-1)}{\text{Step}} > F\_\text{high} \frac{Ps(k)}{\text{Gamma}}$$

Gamma+ = Step $$\text{IF } \frac{Ps(k) - Ps(k-1)}{\text{Step}} < F\_\text{low} \frac{Ps(k)}{\text{Gamma}}$$

Gamma− = Step

--- where
Ps(k): packet success rate at step k
Gamma: target Eb/N0
Step: target Eb/N0 update step
F_high, F_low: parameters (e.g. 1.1, 0.9)

which can also be expressed as:

---

IF ABS(PSR(k)−PSR_old)/Step > F_high*PSR(k)/Gamma
    Gamma += Step
    PSR_old=PSR(k)
ELSE IF ABS(PSR(k)−PSR_old)/Step < F_low*PSR(k)/Gamma
    Gamma −= Step
    PSR_old=PSR(k)
where:
PSR(k) : packet success rate at step k
Gamma : target E_b/N_0
Step : update step
F_high, F_low : parameters (e.g. 1.1, 0.9)

---

Also, note that the selection of gamma^* can take place at the beginning of data transmission, or whenever the dependence of the packet success probability on gamma changes, e.g., when the multi-path characteristics change. The alternative to the above is to perform the selection of gamma^* at the mobile host; such an approach, however, does not have apparent advantages and would result in higher signalling overhead, since measurements of BER would need to be sent to the mobile host, and in increased complexity of the mobile host.

Moreover, it is easier for the RNC to perform this task, since it can compute the packet success rate from the data received by the mobile host, assuming perfect error detection. On the other hand, if the mobile performs the selection, it would have to receive this information from the BS or, more simpler, use information regarding the packet success rate on the downlink, which is available to it, and assume that the packet success rate in the uplink is the same as that in the downlink.

As noted above, gamma^* is used as the target for fast closed-loop power control between the base station and the mobile; this power control loop operates on a much faster timescale compared to the timescale over which the transmission rate is adjusted. Indeed, in WCDMA fast closed-loop power control (in WCDMA, fast closed-loop power control, which operates at the physical layer, is supported on dedicated channels and shared channels in both the uplink and the downlink, and on the uplink common packet channel) operates at a frequency of 1500 Hz, resulting in one power update approximately every 0.67 milliseconds. On the other hand, the rate remains constant within a single frame, whose minimum duration is 10 milliseconds. Hence, the rate control procedure described above works on top of fast closed-loop power control.

Also note that, according to (2) a change in the transmission rate would require adjusting the transmission power in order to maintain the same gamma^*.

Following step 9.1, at step 9.2 the RNC monitors the load on the network. This can be achieved using direct application of the sum of the load factors given by (4), or by measurements of the total interference power Itotal (which includes noise), and the noise power eta. This is discussed in more detail later.

At step 9.3, the RNC sets the price lambda based on the load. This can be performed using a predefined price-load function as shown in FIG. 7.

At step 9.4, the RNC signals the set price to the mobile handsets. This is preferably performed using the setting of an explicit congestion notification bit on packets sent to each mobile, as will be described later, but may also be performed using a dedicated signalling channel.

At step 9.5, following the receipt of the price lambda, each mobile handset finds its optimum transmission rate r_i such that its own user utility value U is maximised using (18). Regarding the selection of optimal r^*_i, recall that the spreading factor can obtain discrete values, ranging from 4 to 256 (512 in the downlink) in powers of 2, hence the transmission rate can obtain discrete values.

At step 9.6, each mobile handset transmits at its calculated rate r_i, and at step 9.7 the RNC charges the MH by the product of the announced price lambda and the rate of resource usage r_i*gamma^*_i. This charge, when explicit congestion notification signalling is used, is given by the rate of ECN marks received by the mobile. The BS/RNC, assuming perfect error detection, can compute the transmission rate r_i. (Note that r_i is the transmission rate, which due to errors in the wireless network, is different from the actual throughput or rate of successfully transmitted data.) Also, the BS/RNC knows gamma_i, since it has computed it (or has received it from the mobile); falsely declaring the latter will reduce a user's charge, in addition to decreasing his resource usage. Hence, there is no parameter that the mobile user can falsely declare in order to reduce his charge, without reducing his level of service.

Following step 9.7, processing returns to step 9.2 for monitoring of the network load and subsequent setting of the price. This involves adjusting the price lambda based on some estimate of the level of congestion of wireless network resources. The specific procedure for adjusting the price is related to how prices are communicated to the mobile user. There are two options: In the first, the RNC can directly announce prices; this requires a new control channel from the RNC to the MH's. In the second option, congestion charges are signalled using ECN marking; this option will be discussed in more detail later.

In the case of explicit price announcement, the price function is of the form $\lambda(\rho): [0,1] \rightarrow [0,\infty]$. One possible price function is the following:

$$\lambda(\rho) = \frac{\phi}{1-\rho}$$

where phi can be adjusted to achieve a target utilization, if a rough estimate of the demand is known.

Another alternative is to have the price adjusted in fixed time intervals k, according to $\lambda(k+1)=\lambda(k)+\kappa(\lambda(k))(\rho-\rho_{target})$ where rho_target<1, and kappa(lambda(k)) determines the magnitude of the price change in each update.

Both of the above two alternatives require measurements of the total load rho. One approach for measuring the total load is to use measurements of the total interference power I_{total} (which includes the noise), and the noise power eta from which the total load can be estimated using:

$$\sum_j \alpha_j^{UL} \leq \frac{I_{total} - \eta}{I_{total}}$$

Advantages of the above are that only aggregate power measurements performed at the base station, are required and CDMA's soft capacity property is implicitly handled. Moreover, current standards provide support for communicating measurements of the total interference and noise between the base station and the radio network controller.

Next the downlink utility function for rate elastic traffic in the first embodiment is described.

The capacity constraint in the downlink is in terms of the maximum power P that the base station can transmit (see (10) previously), and hence an incentive compatible pricing scheme would be for the network to charge the mobile users in proportion to the power p_i used to transmit to each user. In this case, the user optimisation problem becomes:

maximise $U_i(r_i P_s(\gamma_i)) - \lambda p_i$ over r_i>=0, gamma_i>=0 (19)

where lambda is the price per unit of power, and the variables r_i, gamma_i, and p_i are related through (9).

In the above model, mobile users that are far from the base station incur a higher charge, for the same rate r and target bit-energy-to-noise-density ratio gamma. As a result, for the same charge, users far from the base station will send at a lower transmission rate. This results in more efficient utilization of the power at the base station, since it leads to higher aggregate utility.

Note that direct use of the congestion charge in (19) to actually charge mobile users might have disadvantages, since it is an additional source for variability of prices (recall that prices are dynamic, since they depend on the level of congestion).

By considering average values for the orthogonality and noise parameters in (9), one can derive a constraint on the sum of r_I*gamma_I, similar to (7). Hence, in an alternative embodiment, one can consider for the downlink a maximization problem identical to (19). In this case, a user is charged based on the product r_i gamma_i, hence the user problem is:

maximise $U_i(r_i P_s(\gamma_i)) - \lambda r_i \gamma_i$ over r_i>=0, gamma_i>=0 (20)

where again, the optimal value of gamma_i (gamma^*_i) can be found from (17).

By using (20) in the downlink, in the alternative embodiment a user's charge depends only on the performance he experiences, in terms of the transmission rate and signal quality, and is independent of his position.

There is also another reason for preferring (20) compared to (19): closed-loop power control in the downlink has the objective of achieving a specific QoS, in terms of a target E_b/N_O. Adjustment of power based on (19) would replace the usual downlink closed-loop power control, and if it operates on a slow timescale, would result in varying QoS, in terms of received E_b/N_O, due to fast fading (Rayleigh fading). On the other hand, fast timescale rate control is not supported by current standards.

Figure 10:
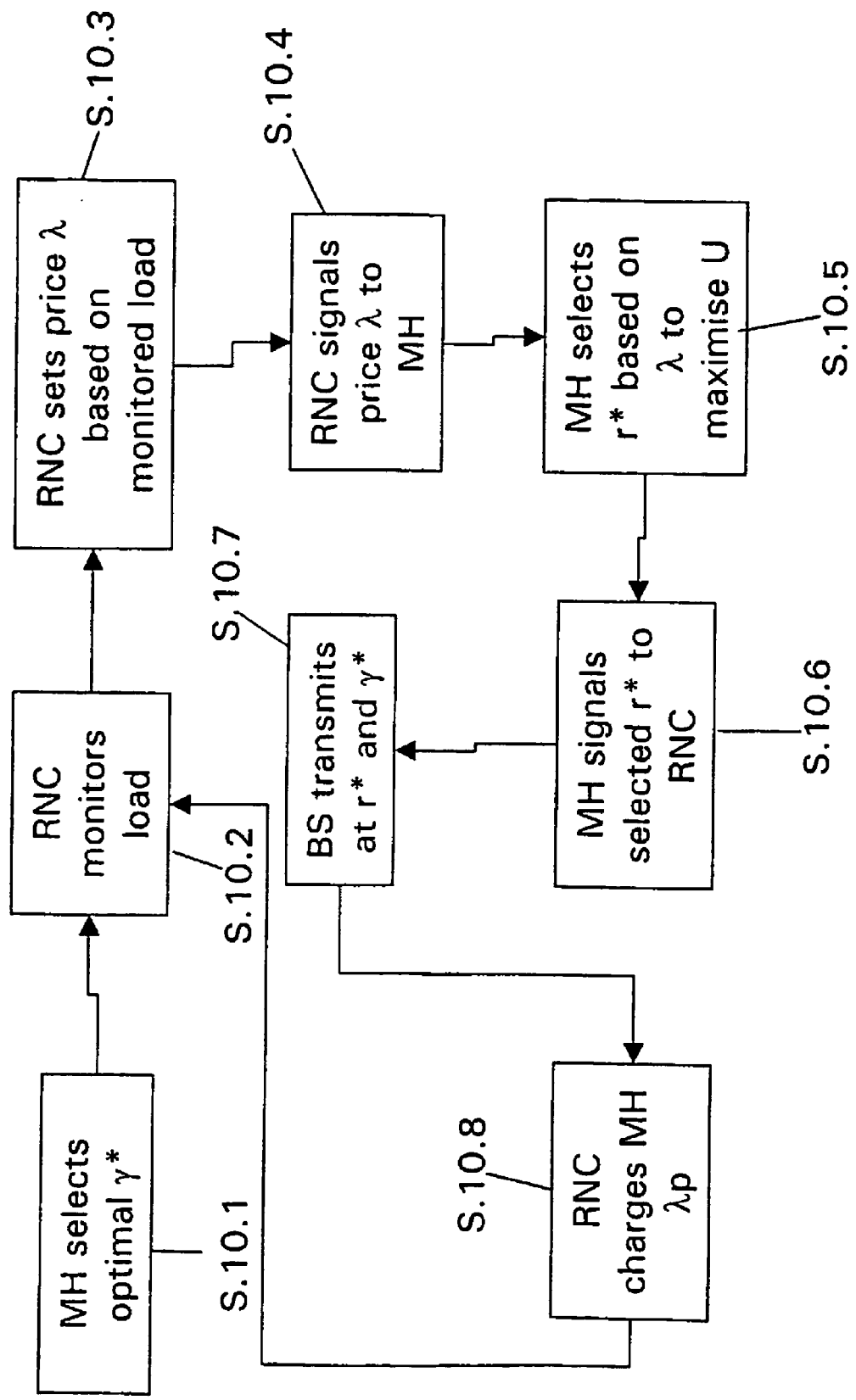
FIG. 10 is a flow diagram showing the steps required for control of a downlink in the preferred embodiment of the present invention.

The procedure for implementing resource control for the downlink assuming explicit communication of prices from the RNC to mobile hosts, is shown in FIG. 10.

At step 10.1 each MH i selects its target gamma_i^* based on (17). As in the uplink, the optimal Eb/No can be found graphically or mathematically, from the probability of a bit being received successfully function (which itself depends on the modulation technique).

At step 10.2, the RNC monitors the load on the network. In the downlink, the total load is based on measurements of total transmitted power:

$$\rho = \frac{\sum_i \tilde{p}_i}{\tilde{p}}$$

where tilde{p}_i is the average power of the signal transmitted to mobile i.

At step 10.3 the RNC sets the price lambda per unit of power based on the monitored load. The setting of the price can be performed using a price/resource function such as is shown in FIG. 7. In the alternative embodiment where the user function is given by (20), the price is set for the same unit of wireless resource as in the uplink.

At Step 10.4, the RNC signals the set price to the mobile handsets. This signalling is performed in the same manner as for the uplink, and further details of a preferred embodiment which makes use of packet ECN bits are given later.

At step 10.5, each mobile uses the signalled price as an input to its user utility function, and finds the transmission rate r_i which maximises the utility value U. When using (19) as the utility function, this step requires that the MH has some estimate of the average values for the path gain g_i, the interference I_i, and the noise eta_i. The latter two can be measured at the mobile host, whereas the path gain can be estimated using the received power of pilot bits in the downlink.

At step 10.6, each mobile signals its chosen r_i to the RNC, to inform the network of the data rate at which it should transmit to the mobile over the downlink.

At step 10.7, the network (more precisely the base station in contact with the particular mobile) transmits at the signalled transmission rate and with the optimal bit-energy, and at step 10.8 the RNC charges the mobile handset with the product of the announced price lambda and the rate of wireless resource usage (preferably power, but in the alternative embodiment r_i* gamma_i)

Following step 10.7 processing returns to step 10.2 for monitoring of the traffic load, and subsequent setting of the price. The procedure then loops around again as described above whilst the link remains in operation.

The above describes a first embodiment which provides resource control dependent upon meaningful physical properties in the form of scarce wireless resources for both the up and down links. In the embodiments to be described next, the user utility function for the uplink is extended to take into account other factors.

More particularly, in a second embodiment, it is possible to modify the user utility function to take include the cost of mobile handset battery power.

The cost of battery power can be included by adding an appropriate term to (18). For example, if the battery cost is linear to the power, we have:

maximise $U_i(r_i P_s(\gamma_i^*)) - \lambda r_i \gamma_i^* - \nu_i p_i$ over r_i>=0 (21)

where p_i is the transmitted power and nu_i is the cost per unit of battery power. The optimal value of gamma_i is found as before using (17).

Observe that the price per unit of battery power may be different for different users; this is motivated both by technological consideration, e.g., different mobiles might have different power supply capacities, and by user related constraints, e.g., depending on their location, different users might have a different ability to recharge their mobile's battery.

Within the second embodiment, the method steps to perform resource allocation are the same as for the first embodiment, with the difference that the user optimisation problem is given by (21).

In a third embodiment the congestion cost for a fixed network to which the wireless network is connected can be taken into account, again by modifying thr user utility function for the uplink as follows:

maximise $U_i(r_i P_s(\gamma_i^*)) - \lambda r_i \gamma_i^* - \mu r_i P_s(\gamma_i^*)$ over r_i>=0 (22)

where mu is the price per unit of bandwidth in the fixed network. Observe that the congestion charge for the fixed network is proportional to the rate of successful data transfer over the wireless network, which is given by r_i Ps(gamma).

As with the second embodiment, within the third embodiment the method steps to perform resource allocation are the same as for the first embodiment, with the difference that the user optimisation problem is given by (22).

Rate-Inelastic Traffic

In a fourth embodiment we consider rate-inelastic traffic., which has minimum rate requirements, but can adapt its target bit-energy-to-noise-density ratio. Such applications include, e.g., streaming video/audio, which can have a fixed transmission rate, but whose quality, as perceived by users, depends on the frame error rate; the latter depends on the signal quality, which is determined by the target bit-energy-to-noise-density ratio.

A possible expression for the utility of rate-inelastic traffic is:

$U_{in}(r,\gamma) = U_r(r) U_q(\gamma)$ where Ur(r), if the user is inelastic to the transmission rate, is a step function and Uq(gamma) can be an increasing concave or a sigmoid function, as for rate elastic traffic; a utility with a sigmoid shape is able to capture minimum requirements in terms of gamma, and can be justified by the shape of the packet success rate as a function of gamma (see FIG. 4).

In the uplink, as discussed previously for rate-elastic traffic, the congestion charge for user i is proportional to the product r_i gamma_i, hence the user problem involves the following maximization of the following function:

$U_{q,i}(\gamma_i) - \lambda r_{min,i} \gamma_i$ over gamma_i>=0 (23)

The optimal gamma^*_i for achieving the maximum in (23) satisfies:

$U'_{q,i} = \lambda r_{min,i}$ (24)

In the downlink, as discussed in the first embodiment with respect to elastic traffic charges are proportional to the transmission power. Hence, the user objective is to maximize the expression:

$U_{q,i}(\gamma_i) - \lambda p_i$ (25)

where r_i, gamma_i, and p_i are related through (9).

The above optimisation can be performed over the target bit-energy-to-noise-density ratio gamma_i; such an approach would require some estimates of the average value for the path gain, the interference, and the noise, which together with the rate r_{min,i} and signal quality gamma_i determine the average power, hence the average charge. The value gamma^*_i that maximizes the net utility is then handed to fast closed-loop power control, which adjusts the power in order to achieve this target.

Figure 9:
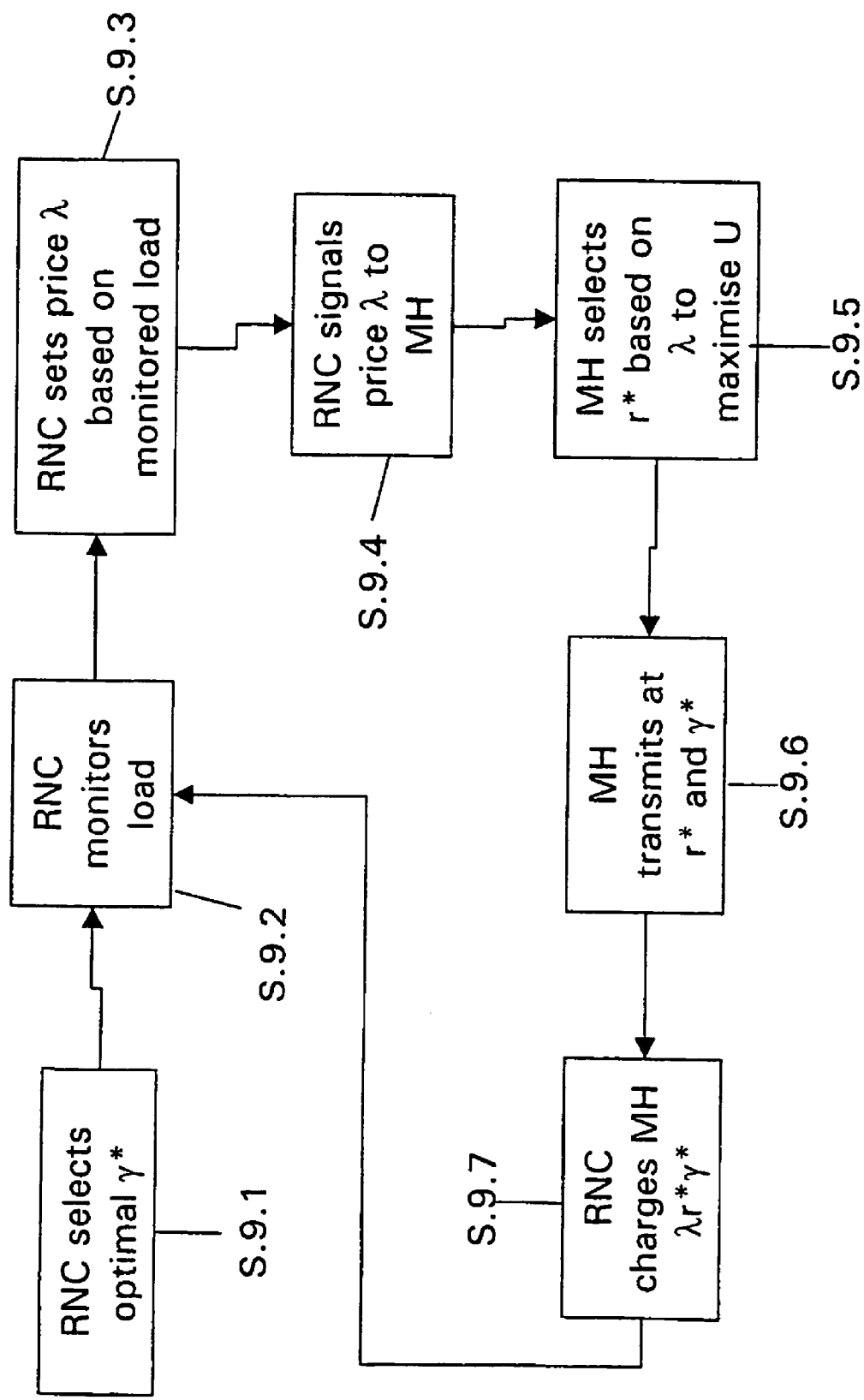
FIG. 9 is a flow diagram showing the steps required for control of an uplink in the preferred embodiment of the present invention.
Figure 13:
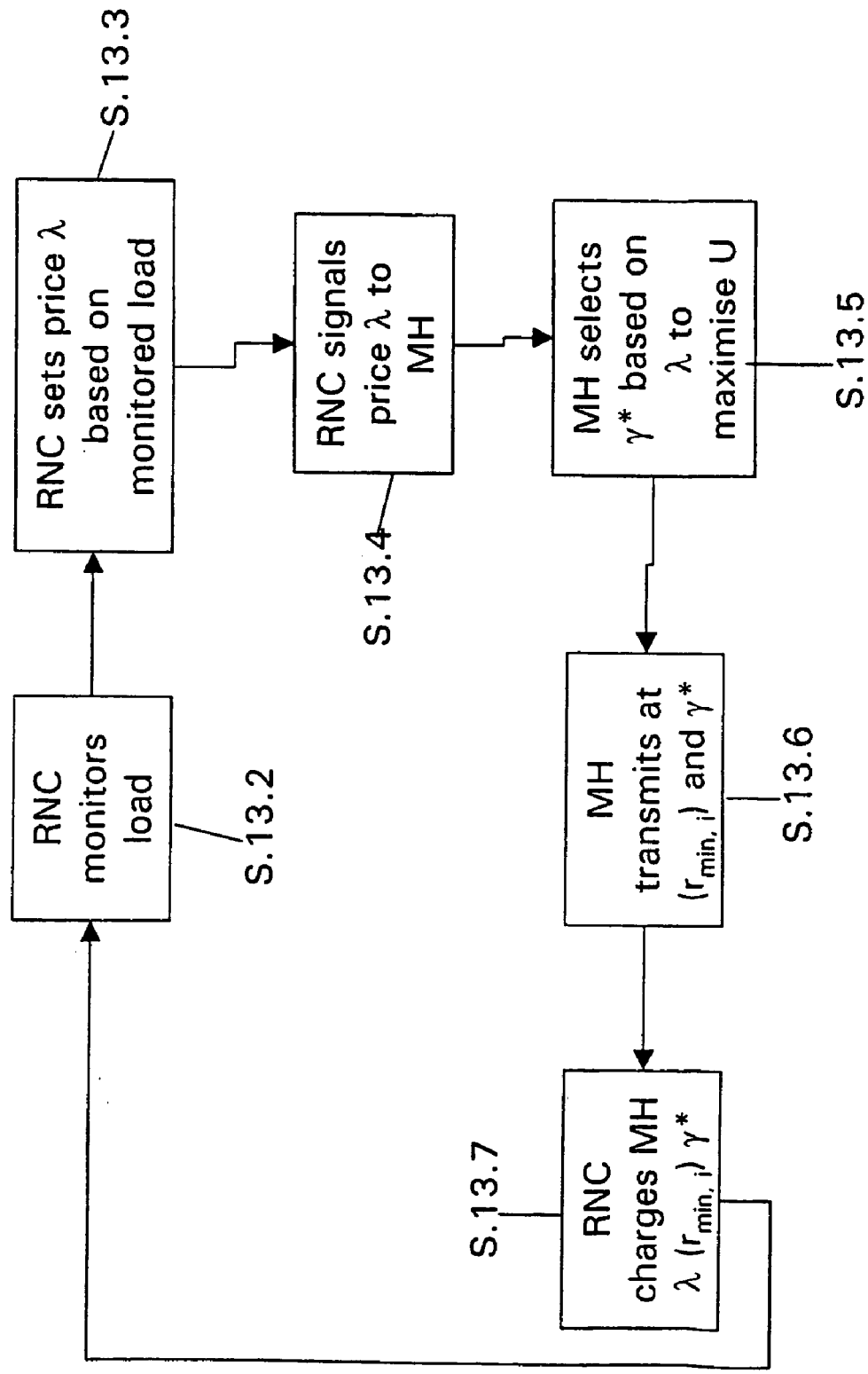
FIG. 13 is a flow diagram showing the steps required for control of an uplink in another embodiment of the present invention.
Figure 14:
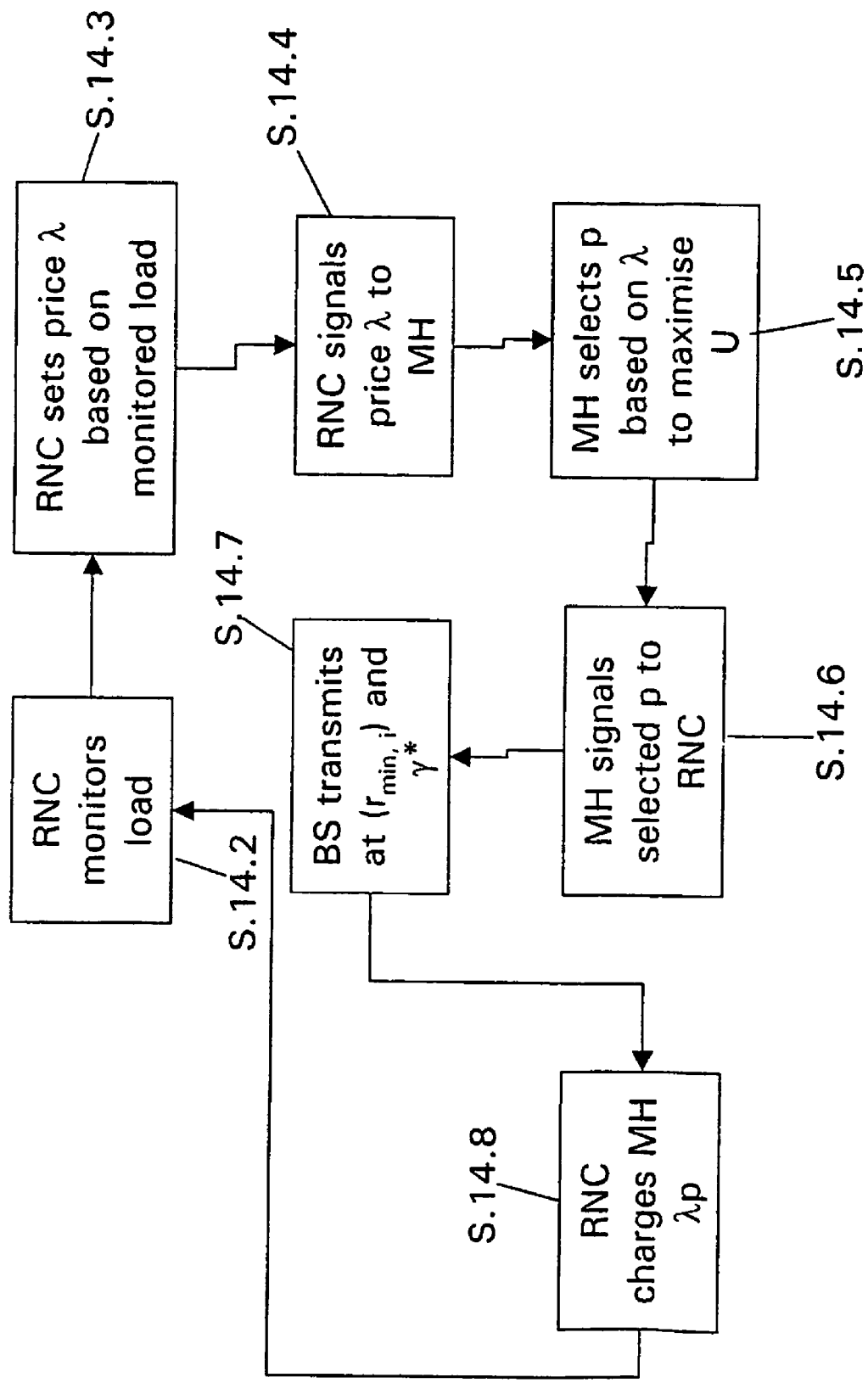
FIG. 14 is a flow diagram showing the steps required for control of a downlink in another embodiment of the present invention.

As to the method steps required to perform resource allocation for rate-inelastic traffic within the fourth embodiment, the steps required for the up-link are shown in FIG. 13, whereas those for the downlink are shown in FIG. 14. The principal difference between this embodiment and the rate-elastic traffic embodiment is that the transmission rate r in the present case is not variable, and hence the user utility values must be maximised by choosing an appropriate transmission energy instead. Therefore, the steps 13.2, 13.3, 13.4 for the uplink can be considered substantially the equivalent of steps 9.2, 9.3, and 9.4 of FIG. 9, with the differences that the price lambda is set instead as a function of the fixed rate r_{min,i} and the signal quality gamma_i. Then, at step 13.5 the mobile selects gamma^* using (24), and at step 13.6 transmits at r{min,i} and gamma^*. At step 13.7 the BS then charges in accordance with the wireless resource usage r_{min,i} and gamma^*.

In the downlink, the steps 14.2, 14.3, and 14.4 can be thought of as substantially similar to those of 10.2, 10.3, and 10.4 with the differences that the price lambda is set instead as a function of the transmission power p. At step 14.5 the mobile selects p to maximise (24), and at step 14.6 signals p to the base station. At step 14.7 the base station then transmits at r_{min,i} and p. At step 14.8 the BS then charges in accordance with the wireless resource usage p.

In a fifth embodiment, we present a further user utility function which can be used for hybrid code/time division scheduling.

WCDMA supports both code division and time division scheduling for packet transmission. Time division scheduling has the advantage of supporting higher transfer rates for the same energy per transmitted bit, compared to code division scheduling, but requires synchronization and has the disadvantage of non-continuous transmission, which results in bursty traffic. Indeed, it can be shown that in a hybrid code and time division scheduling system supporting real-time (delay intolerant) and non real-time (delay tolerant) traffic, both with fixed target E_b/N_O, the aggregate transmission rate of non real-time traffic is maximized if it is scheduled so that only one non real-time source sends traffic in each time slot. Unlike time division multiplexing, code division scheduling supports continuous data transmission, but has the disadvantage of lower instantaneous bit rates.

Shared channels and the common packet channel (used in the uplink) in WCDMA typically use both time division and code division multiplexing. In the downlink, orthogonal codes are shared between many users in a time division manner, i.e., there may be many common packet channels per cell, each having a different bit rate and shared amongst many users in a time division manner. On the other hand, dedicated channels typically use code division scheduling, hence in the downlink an orthogonal code is consumed for each user of a dedicated channel. Indeed, for dedicated channels the bit rate can change during transmission, but remains constant within a single frame that has a minimum duration of 10 ms, and the orthogonal code must be allocated according to the highest bit rate. Nevertheless, the standards specifications for WCDMA do not preclude using time division scheduling for dedicated channels.

In the fifth embodiment we provide a method which exploits the tradeoffs between code division and time division multiplexing solely in terms of the net utility maximization problem.

First, observe that for hybrid code and time division multiplexing, the constraint on resource usage in the uplink becomes $$\Sigma \alpha_i \zeta_i < 1$$

where $$\alpha_i = \frac{r_i \gamma_i}{W + r_i \gamma_i}$$

is the resource usage for the uplink in pure code division multiplexing systems, and zeta_i is the percentage of time slots in which user i sends traffic.

Next, we present a utility model for elastic users which value, in addition to the average throughput, whether they can continuously transmit data. For the latter, we consider the expression $$U_{cont,i}(\zeta_i)$$

where zeta_i is percentage of time slots in which user i sends data.

The overall utility for a user that values both the average throughput and how continuous his transmission is, can be taken to be $$U_i(r_i P_{s,i}(\gamma_i)) + U_{cont,i}(\zeta_i)$$

hence the user's net utility maximization problem is:

maximise $U_i(r_i P_{s,i}(\gamma_i)) + U_{cont,i}(\zeta_i) - \lambda \alpha_i \zeta_i$ over r_i=>0 gamma_i=>0 and zeta_i=>0. (26)

Taking the partial derivatives, with respect to r, gamma, zeta, of the objective function in (26) and equating them with zero it is possible to show that once again the optimal value of gamma can be found from (17) in the same manner as previously described for the first embodiment, and that:

$$U'_{cont,i}(\zeta_i^*) = \lambda \frac{(r_i \gamma_i)^2}{(W + r_i \gamma_i)^2} \qquad (27)$$

If U'cont,i(zeta) is increasing and strictly concave, then from (27) we have that a smaller congestion price lambda results in a larger zeta^*_i. Moreover, for a larger number of mobile users, the optimal value zeta^*_i is larger. Indeed, if we had assumed alpha_i≈(r_i*gamma_i)/W, which becomes accurate when there is a large number of mobile users, then U'cont,i(zeta_i) approx 0, hence the value of zeta_i would be selected so as to maximize the utility Ucont,i(zeta_i).

Within the fifth embodiment the actual procedure for performing wireless resource control for hybrid code/time division scheduling is substantially the same as for the first embodiment, with the differences that the utility function (26) is used as the utility function by the mobile handset, and the RNC announces the price lambda as a function of alpha_i and zeta_i. As the optimal value of gamma can still be found from (17), and the optimal value of zeta from (27), the problem is reduced to finding the maximum value of (26) with respect to r_i, as in the other embodiments. That is, within the fifth embodiment the handset finds r_i which maximises (26), and then either uses it as its transmission rate for the uplink, or transmits the found value to the base station and network controller for use in the downlink.

Congestion Control Signalling

Prior to describing further embodiments for other different types of traffic, we will first discuss at this point how the prices of wireless resource can be communicated to end users in a seamless manner, using appropriate marking of explicit congestion notification bits.

To achieve seamless wireless/wire-line congestion control, the feedback sent to end-systems must include the congestion charge for both wire-line and wireless network resources. In fixed wire-line networks, Explicit Congestion Notification (ECN) marking will become the standard mechanism for conveying congestion information to end-systems. Indeed, the use of ECN marking has been proposed for improving the performance of TCP over wireless networks and for 3G wireless networks. For the above reasons, within the present invention we propose to use ECN marking as the signalling mechanism to provide congestion feedback for wireless resources.

Figure 11:
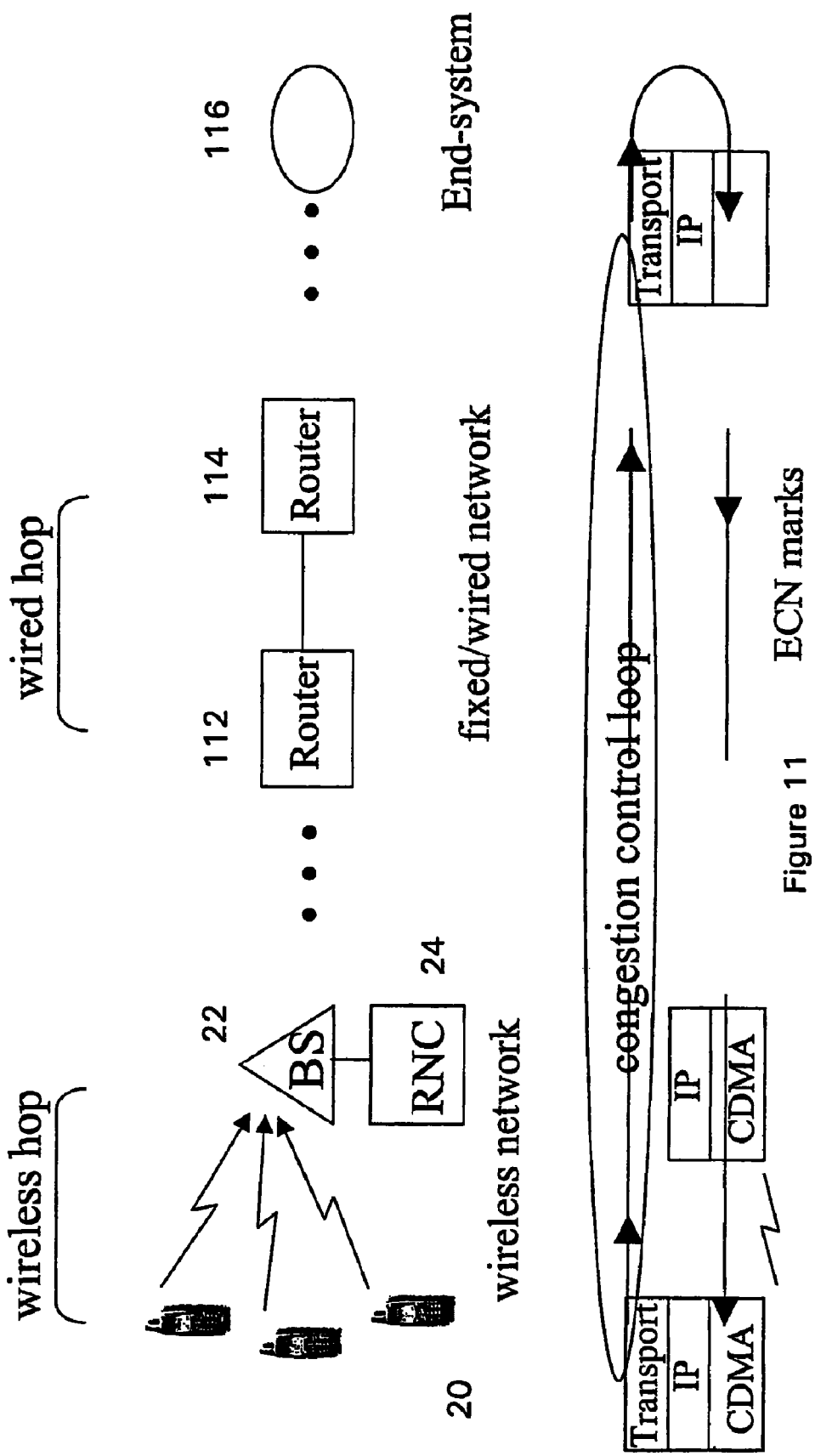
FIG. 11 illustrates the flow of ECN marks used in the preferred embodiment of the present invention.

Our approach involves performing ECN marking at the RNC, based on the level of congestion of wireless resources and the resource usage of each mobile. With such an approach, in the case of uplink data transmission, the ECN marks returned to the mobile will include congestion feedback for both wire-line and wireless network resources, as shown in FIG. 11.

Figure 12:
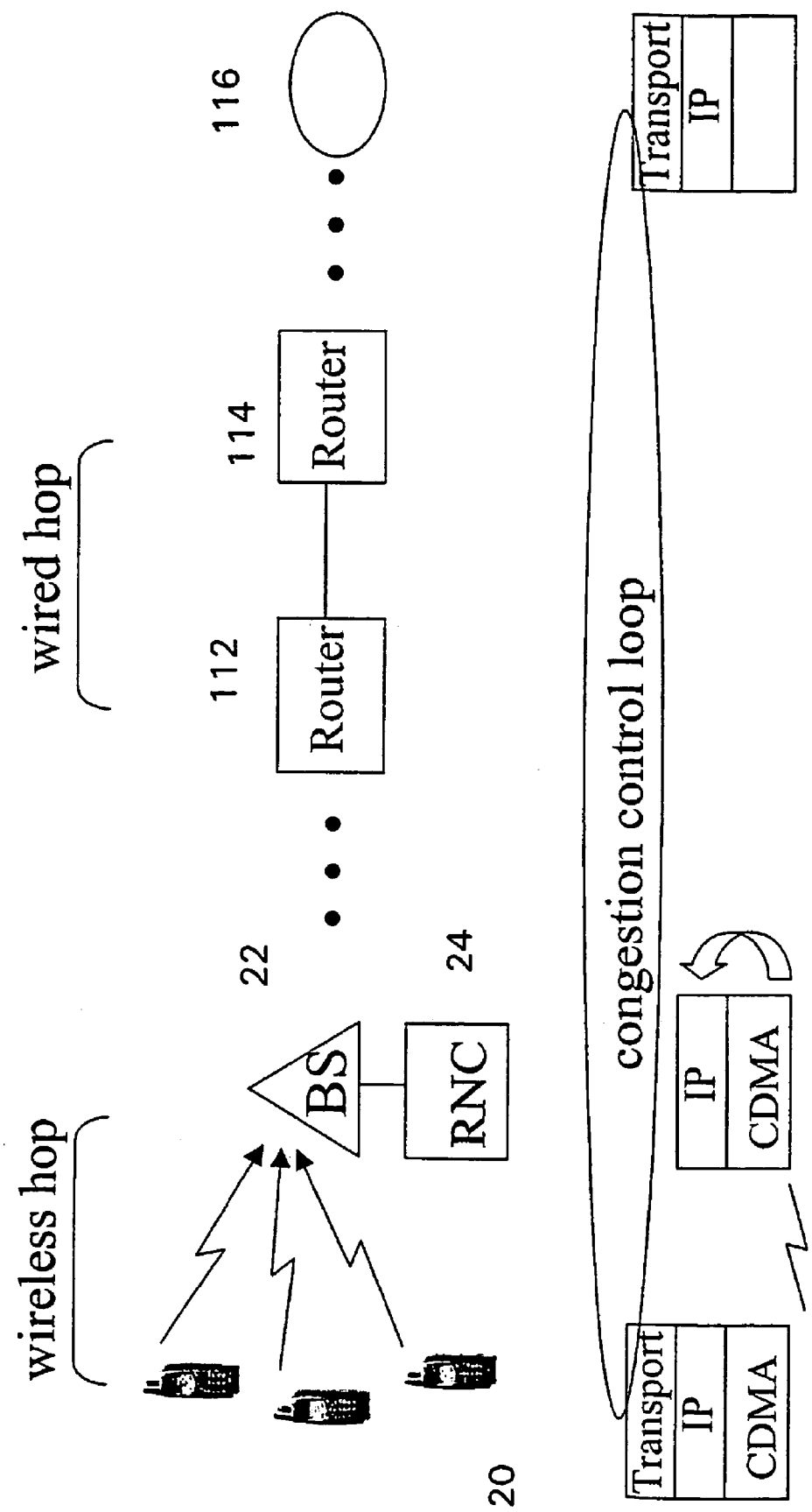
FIG. 12 shows how the ECN marks can be seamlessly integrated to provide a congestion control loop.

The RNC performs ECN marking based on the level of congestion and the usage of wireless network resources. To perform this functionality, the RNC needs information regarding the load and the target signal quality; such information is available at the CDMA layer, and the corresponding measurements are performed at the base station, as illustrated by the control loop in FIG. 12.

The RNC is an appropriate location to perform ECN marking, since it is responsible for managing radio resources, and performs admission control and transmission scheduling. Of course, the approach requires that the RNC has IP layer functionality, which is the case in the 3GPP2 (3rd Generation Partnership Project 2) radio access network architecture. If the RNC does not contain an IP layer that peers with the IP layer at the mobile host and the IP layer at the first router in the data network, then some additional functionality is required in the device where such an IP layer exists.

In a GPRS (Generic Packet Radio Service)-based core network, this IP layer exists in the gateway GPRS support node (GGSN)

Next we discuss in detail how ECN marking should be performed for the uplink and the downlink, in order to reflect the level of congestion and the resource usage of each mobile. Important differences between the two is in the resource constraint, hence how the load is measured, and that in the uplink there is no shared buffer, whereas in the downlink the RNC can contain a shared buffer.

ECN Marking for the Uplink

Recall that in the uplink, and when there is a large number of mobile users, resource usage for a mobile i is determined by the product of the transmission rate $r_i$ and the signal quality, expressed in terms of the target bit-energy-to-noise-density ratio $\gamma_i$. Since the rate of successful packet transmission is $r_i P_{s,i}(\gamma_i)$, in order to achieve a feedback rate that is proportional to $r_i \gamma_i$, the marking probability needs to be proportional to $\gamma_i/P_{s,i}(\gamma_i)$; note that this quantity is used during outer loop power control at the RNC, since the optimal $\gamma_i$ is determined from (17) and needs to be made known to the IP layer, where marking is performed. Moreover, since the marking probability is different for different mobiles, the RNC needs to be able to associate IP addresses with the mobile identifiers used at the CDMA layer.

In addition to the amount of resources used by each mobile, the marking probability should reflect the level of congestion. In the uplink of a CDMA network there are no shared buffers, hence a queue-dependent marking scheme, such as RED (Random Early Detection), can not be applied. Moreover, because there is no shared buffer, direct application of the virtual queue marking scheme results in a threshold marking algorithm, where packets are marked whenever the rate, measured over some time interval, is above a threshold; such a scheme would produce bursts of marks, which typically result in lower throughput.

In order to achieve a smoother feedback, we can have the marking probability depend on a function that increases smoothly as the load increases. (The threshold marking scheme corresponds to a step-wise function.) Possible functions of the form $P(\rho): [0,1] \to [0,1]$, where rho is the total load, include the following:

$$\frac{1-e^\rho}{1-e}; \text{ or}$$

$$\frac{1-\chi^\rho}{1-\chi}; \text{ or}$$

{0 if rho<=rho_O}
{a*rho if rho>rho_O}

The first function has no parameters to tune. The second, which is a generalization of the first, has one parameter, chi, that controls the degree of convexity of the marking probability curve. Finally, the third has two parameters: rho_O,a.

In the embodiments, let $Q\_=\gamma_i/P_s(\gamma_i)$ and $Q_{max}=\max_i\{Q\_i\}$. Based on the above discussion on resource usage and the level of congestion, the marking probability $M_i$ for mobile i should be given by:

$$M_i = \frac{Q_i}{Q_{max}} P(\rho)$$

The reason for dividing with Qmax is because the marking probability should be less than 1.

Since by definition $P(\rho)<=1$, dividing with $Q\_\{max\}$ ensures that the marking probability for all mobiles is less than 1.

Note that for a buffer-less link in a fixed wire-line network, the marking probability would simply be $P(\rho)$; this is the case because in fixed networks resource usage for a stream is given by its average rate, hence the marking probability is the same for all streams.

ECN Marking for the Downlink

Unlike the uplink, in the downlink there can be a shared buffer located at the RNC. Hence, queue-dependent marking algorithms, such as RED and virtual queue marking, are possible. An issue regarding the latter is that in the downlink there is no fixed maximum transmission rate; rather, the transmission rate depends, in addition to the maximum transmission power, on the path gains, the target signal qualities, and the interference for all mobile users. Nevertheless, an estimate of the maximum transmission rate r^ can be found based on average values for the path gain, target E_b/N_O, orthogonality, and noise. Alternatively, a more adaptive scheme can consider measuring the current transmission rate r_i and corresponding power p. These measurements can be averages over fixed time intervals or estimates using exponential weighted averaging. From these measurements an estimate of the maximum transmission rate can be found using $$r\hat{} = r_i \frac{P}{p}$$

where P is the maximum transmission power from the base station. Note that the last equation estimates the maximum transmission rate assuming that the distribution of traffic to the various mobiles remains the same.

Given the estimate on the maximum transmission rate r^, the virtual queue can be defined to have rate theta*r^ and buffer theta*b, where b is the size of the shared buffer and theta<1 is the virtual queue factor.

In the downlink, resource usage is determined by the transmitted power. Hence, the marking probability should be proportional to p/r_i, where p and r_i are the average power and rate for user i; these can be measured in fixed time intervals, or estimated using exponential weighted averaging.

Let S_i=p/r_i and Smax=max_i{S_i}. To account for both the level of congestion and resource usage, the marking probability for mobile i for the downlink is given by $$M_i = \frac{S_i}{S_{max}} P(\rho)$$

where the function P(rho): [0,1]→[0,1] is determined by the virtual queue algorithm, or any other similar algorithm. For a link in a fixed wire-line network, the marking probability would simply be P(rho). As in the uplink, the reason for dividing with Smax is to have a marking probability less than 1 for all mobiles.

Note that some percentage of packets, hence ECN marks, will be lost as they are sent from the base station to the mobile. Hence, the rate of ECN marks the mobile observes will be less than the rate which depicts the actual congestion charge in the wireless and wire-line networks. Indeed, if the packet success probability is omega_i=Ps,i(gamma_i), then the rate of marks will be omega_*x_i, where x_i is the rate of marks leaving the base station.

The congestion control algorithm at the mobile will determine how lost or corrupted packets are interpreted. Nevertheless, to retrieve the actual rate of marks, the mobile can assume that for each ECN mark received there is an additional mark with probability (1/omega_i−1).

Hence, the rate of these additional marks will be:

$$\left(\frac{1}{\omega_i} - 1\right)\omega_i x_i = (1 - \omega_i)x_i$$

which added to the rate of marks in successfully received packets omega_i*x_i results in an average mark rate equal to x_i.

The approach described above requires that the TCP/IP stack be aware that it is running over a wireless network.

An alternative approach, which reduces the complexity at the mobile host and enables the same congestion control algorithm to run in both a mobile and a fixed host, is for the RNC to add, for every marks its sees, an additional mark with probability (1/omega_i−1); assuming that the marking probability is small, hence we don't end up marking already marked packets, the rate of marks leaving the RNC becomes x_i/omega_i, hence the rate of marks that successfully reach mobile i is x_i. The congestion control algorithm at the mobile can now simply ignore corrupted packets, and assume that the presence of congestion is indicated solely with the receipt of an ECN mark.

Further Embodiments for Loss-Sensitive Traffic

The embodiments described above consider the case where users value solely the average throughput with which their data is successfully transmitted. Such users would be indifferent to the packet loss rate, as long as the average throughput, i.e., the packet success rate multiplied with the transmission rate, remains the same. The above user type corresponds to the case of best-effort data delivery. On the other hand, in the case of real-time traffic, the packet loss rate would affect a user's valuation, since lost packets (including packets with errors) would need to be retransmitted; hence, a higher loss rate would result in a larger percentage of packets incurring a higher delay. In the following embodiments we extend the models and procedures of described previously for the case of traffic where users, in addition to the average throughput of data transmission, also value the packet loss rate or loss ratio. We will refer to such traffic as loss-sensitive. In addition, we propose and investigate approximations that simplify the application of the resulting models. Indeed, we show that procedures, namely the outer loop power control algorithm, proposed for the simple case of best-effort traffic can be incrementally modified to take into account loss-sensitivity.

Unlike the case of loss-insensitive traffic where the optimal target bit-energy-to-noise-density ratio, $E_b/N_o$, is independent of the transmission rate, for loss-sensitive traffic the optimal target $E_b/N_o$ depends on the user utility and the transmission rate. However, in the weight-based service differentiation model for loss-sensitive traffic, the optimal target $E_b/N_o$ is independent of the transmission rate, and depends only on the user's loss sensitivity.

A second extension to the previously described embodiments that we make in the following embodiments is as follows: In the previous embodiments it was assumed that the packet success rate was solely a function of the signal quality, namely the bit-energy-to-noise-density ratio, and was independent of the transmission rate. Commonly in practise, however, the required bit-energy-to-noise-density ratio in order to achieve some given packet success rate may be smaller for higher bit rates. This is due to the fact that the performance depends on the accuracy of the channel and bit-energy-to-noise-density ratio estimation algorithms, which are based on reference symbols in the physical control channels. The more power allocated to the control channel, the more accurate the estimation procedure. The power level for the control channels is typically higher for higher bit rates, hence higher bit rates yield better performance in terms of the packet success probability, for the same target $E_b/N_o$.

In addition in a further embodiment to be described below we describe rate selection procedures that take into account the fact that the transmission rate in WCDMA can obtain values from a small discrete set.

Loss-Sensitive Traffic

In this section we describe an embodiment which uses a utility for loss-sensitive traffic, where the user, in addition to valuing the average throughput, is sensitive to the loss rate his data is encountering. The resulting models and procedures are shown to extend the corresponding results for the loss-insensitive traffic case in an incremental way.

The dependence of the user's utility on the loss rate can be expressed as a factor in the utility that is a function of the loss rate or loss ratio. In this present description we assume that the factor of the loss rate affects a user's utility in a subtractive way.

The utility for a user which, in addition to valuing his average throughput, is sensitive to the loss rate his data is encountering, can take the following form $$U(rPs(\gamma))-V(r(1-Ps(\gamma))) \quad (28)$$

Where $U(rPs(\gamma))$ represents the user's valuation for the average throughput with which he is transmitting, and $V(r(1-Ps(\gamma)))$ the decrease of the user's utility due to losses.

Figure 22:
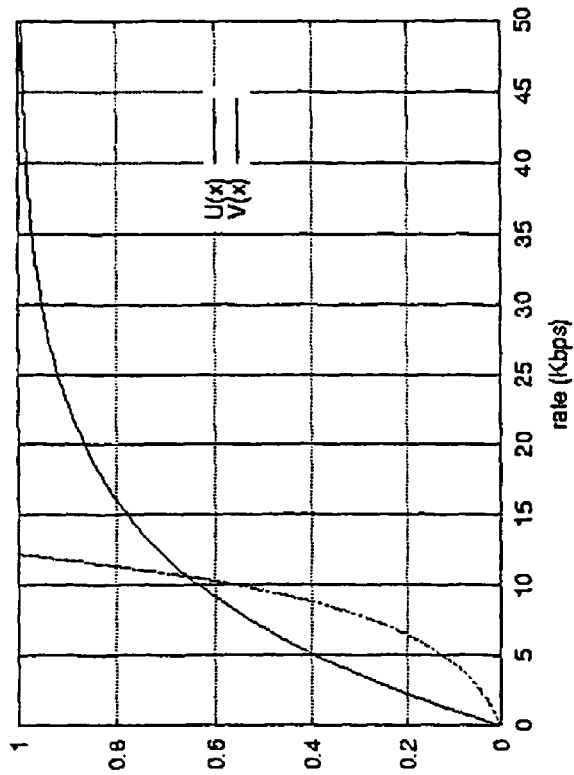
FIG. 22 is a graph showing user utility (U(x)) as a function of average throughput, together with a plot of decrease in user utility (V(y)) as a function of loss-rate.

Typically, the factor representing the value for the average throughput is an increasing concave or sigmoid function. On the other hand, one can argue that the factor representing the decrease of the utility due to losses is an increasing convex function: for a small loss rate, an increase of the loss rate has a smaller effect on the user's utility compared to the effect the same increase has for a larger loss rate. This is illustrated in FIG. 22, which shows that the two factors of the utility represent the value obtained for some average throughput $U(x)$, where x is the average throughput, and the factor due to losses $V(y)$, where y is the loss rate. An example of this effect is streaming video: here, for a small loss rate the effect on a user's perceived quality for an increase of the loss rate is smaller, compared to when the same increase occurs for a larger loss rate.

Some other forms for the user utility are the following. If a user is sensitive to the loss ratio, rather than loss rate, then his utility can take the following form $U(rPs(\gamma))-V(1-Ps(\gamma))$.

On the other hand, the loss-sensitivity factor can affect the utility in a multiplicative, rather than a subtractive, manner i.e.

$$U(rPs(\gamma))V(r(1-Ps(\gamma))),$$

where now $V(y)$ is a decreasing concave function taking values on [0,1]. It is concave because when the packet success probability is close to 1, or equivalently when the loss rate is close to zero, then an additional increase of the loss rate does not have a large effect on the user's utility.

Consider now the uplink direction for loss-sensitive traffic, and assume there is a large number of mobiles, each using a small portion of the total capacity. The wireless resource constraint is given by (7) above:

$$\sum_i r_i \gamma_i < W$$

in order to provide the right incentives for efficient use of network resources, user i's charge should be proportion to his resource usage, which is given by the product $r_i\gamma_i$. Hence, in the uplink the user optimisation problem is:

maximize $U_i(r_i P_s(\gamma_i))-V_i(r_i(1-P_s(\gamma_i)))-\lambda r_i\gamma_i$ over $r_i \geq 0, \gamma_i \geq 0$ \quad (29)

where $\lambda$ is the shadow price for resource $r_i\gamma_i$.

One can prove that a necessary condition for achieving the optimality in (29) is the following $$P'_S(\gamma_i^*)\gamma_i^* = P_S(\gamma_i^*) - \frac{V'_i(r_i^*(1-P_S(\gamma_i^*)))}{U'_i(r_i^* P_S(\gamma_i^*)) + V'_i(r_i^*(1-P_S(\gamma_i^*)))} \quad (30)$$

where $n^*$, $\gamma_i^*$ are the optimal rate and target bit-energy-to-noise-density ratio, respectively.

On the other hand, in the case of loss-insensitive users the corresponding condition is $$P_s(\gamma_i^*)\gamma_i^* = P_s(\gamma_i^*) \quad (31)$$

Note that due to different multi-path characteristics, the packet success rate will in general be different for different mobiles.

Comparing (30) with (31) we observe the following important difference: For loss-insensitive traffic, the optimal target signal quality $\gamma_i^*$ depends solely on the function $Ps(\gamma)$, and is independent of both the user utility and the transmission rate. On the other hand, for loss-sensitive traffic, the optimal $\gamma_i^*$ depends on the user utility, hence the rate, through the derivatives $U_i'(x)$ and $V_i'(y)$. Nevertheless, observe that for loss-sensitive traffic there is still no direct dependence of $\gamma_i^*$ on the shadow price $\lambda$.

Figure 15:
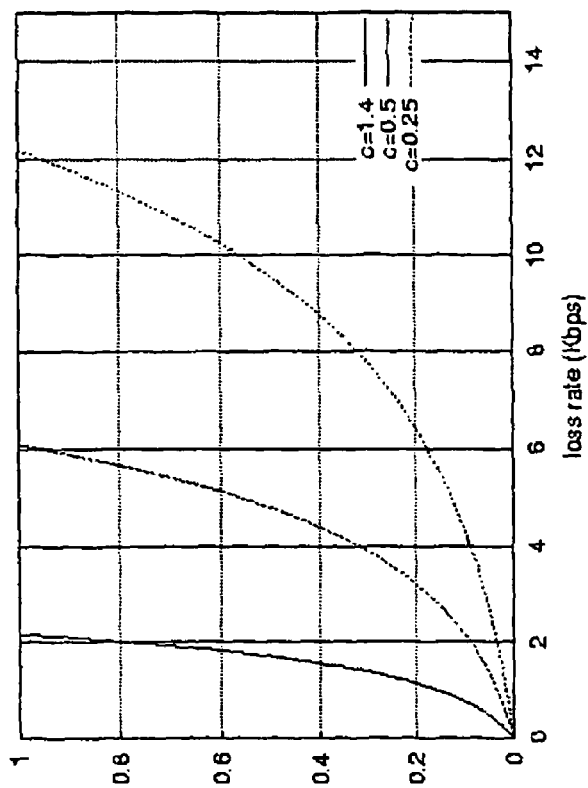
FIG. 15 is a graph illustrating packet success rate as a function of bit energy to noise density ratio for DPSK modulation with no error correction.

Since both $U_i(x)$ and $V_i(y)$ are increasing functions, the ratio on the right hand side of (3) is positive. Due to the sigmoid shape of the packet success rate as a function of $\gamma$ we can see that, as one would expect, the optimal $\gamma_i^*$ in the case of loss-sensitive traffic is higher than in the case of loss-insensitive traffic. This is illustrated in FIG. 15. Here, FIG. 15 shows the packet success rate as a function of $\gamma$ for DPSK modulation, when there is no error correction and the packet length is L=60 bits. The optimal $\gamma^*$ that satisfies (30) is larger than the value that satisfies (31); the latter can be found graphically as the value of $\gamma$ at which the line passing through the origin is tangent to $Ps(\gamma)$. The line passing the origin which is lower than the above line corresponds to the loss-sensitive traffic.

The equation (30) is preferably approximated by a less complicated model, which has important engineering implications, since it greatly simplifies the application of the models and procedures for loss-sensitive traffic. The approximation is motivated by the fact that, for a number of modulation schemes discussed earlier, the optimal target signal quality is such that the packet success rate obtains large values, typically larger than 80%.

Hence, considering $Ps(\gamma)\approx1$, an approximation of (30) is the following $$P'_S(\gamma_i^*)\gamma_i^* \approx P_S(\gamma_i^*) - \frac{V'_i(0)}{U'_i(r_i^*) + V'_i(0)} \quad (32)$$

In the above approximation, the optimal target bit-energy-to-noise-density ratio $\gamma_i^*$ depends on the valuation of the throughput at rate $r_i$ and the loss-sensitivity at the neighbourhood of the loss rate around 0.

Next we present numerical investigations for different loss-sensitivities and transmission rates, which show that the approximation (32) of (30) is quite accurate. The approximation has important engineering implications since, as we discuss in detail later, it can simplify the application of the model by incrementally extending the corresponding procedures for loss-insensitive traffic.

Numerical Investigations

Here we investigate the models presented in the preceding subsections, and in particular the effects of the loss-sensitivity on the optimal target bit-energy-to-noise-density ratio and the accuracy of the approximation (32) presented above.

Figure 16:
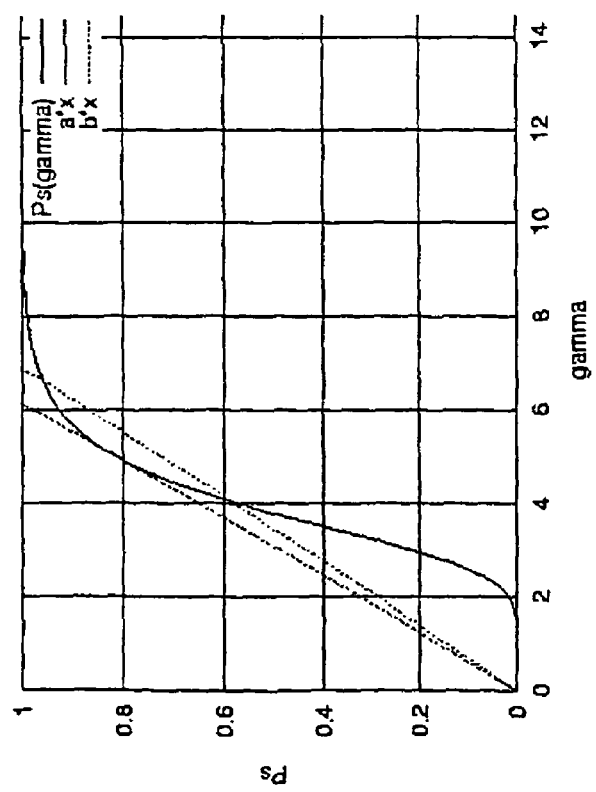
FIG. 16 is a graph illustrating loss-sensitivity used in the description of the loss-sensitive embodiments of the invention.

FIG. 16 shows the factor for the loss-sensitivity $V(y)$, given by $$V(y)=d(e^{cy}-1) \quad (33)$$

Where the loss-sensitivity is expressed by the variable c: a higher value of c results in a higher sensitivity to the loss rate.

Here the loss-sensitivity decreases from left to right: a higher value of c in (33) corresponds to a higher loss-sensitivity. d=0.5, b=0.1.

The user utility we consider has the form $$U(x) = 1 - e^{-bx}$$

although our investigations consider the above functions for the two factors of the user utility, the qualitative conclusions hold for more general forms of the user utility.

Figure 17:
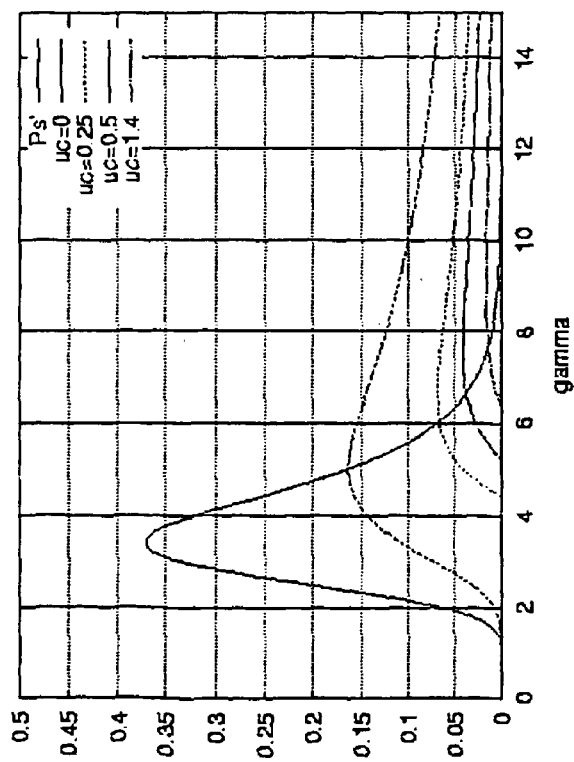
FIG. 17 is a graph illustrating loss-sensitivity.

The effect of the loss-sensitivity on the optimal $\gamma^*$ is shown in FIG. 17. The optimal $\gamma^*$ corresponds to the intersection of the curve $Ps'(\gamma)$ with the curve $Ps(\gamma)/\gamma$ in the case of loss-insensitive traffic (see equation (31)), and the curve $$f(\gamma) = \frac{P_S}{\gamma} - \frac{V'(r(1-P_S(\gamma)))}{U'(rP_S(\gamma)) + V'(r(1-P_S(\gamma)))} \frac{1}{\gamma}$$

in the case of loss-sensitive traffic (see equation (30)). Observe that the $\gamma^*$ in the case of loss-sensitive traffic is larger than in the case of loss-insensitive traffic. Furthermore, a larger loss-sensitivity, i.e., larger value of c in (33), results in a larger value of the optimal $\gamma^*$. Indeed, for loss-sensitive traffic the values of $\gamma^*$ are larger than 6, which from FIG. 15 corresponds to packet success ratios Ps larger than 90%. This result further justifies the approximation Ps≈1.

Figure 18:
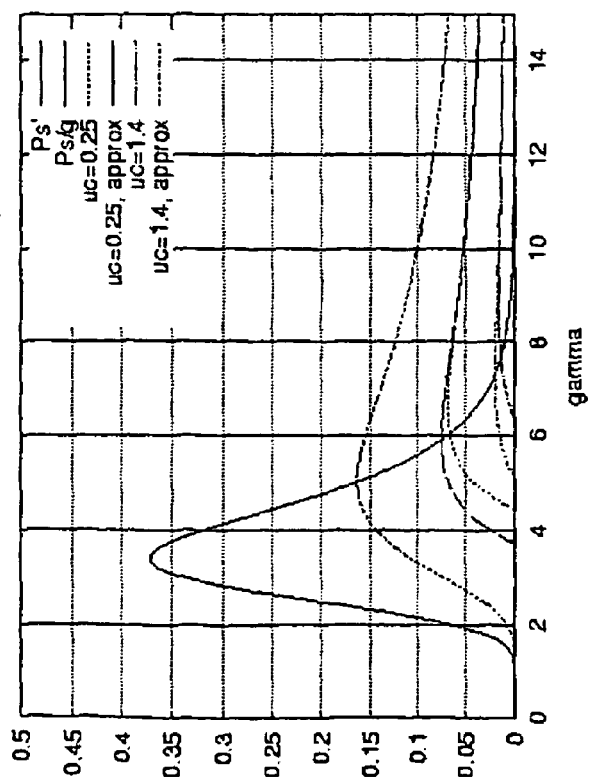
FIG. 18 is a graph illustrating the effect of loss-sensitivity on the accuracy of an approximation made in one of the embodiments of the invention.

FIG. 18 shows the accuracy of the approximation discussed above, for different loss-sensitivities. Observe that the approximation is quite accurate: the discrepancy between the exact model given by (30) and its approximation given by (32) is less than 8%. Moreover, the figure shows that the accuracy of the approximation is higher for small loss-sensitivities. Note that the Figure was generated with the following parameters: r=20 Kbps, utility parameters: b=0.1, d=0.5.

Figure 19:
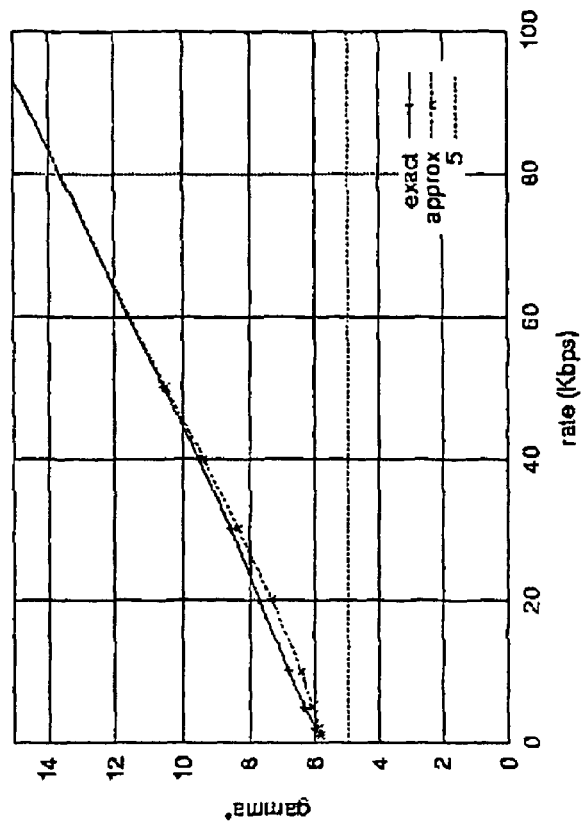
FIG. 19 is a graph illustrating the transmission rate on the accuracy of the approximation.

The previous results consider a fixed transmission rate r=20 Kbps. FIG. 19 shows that the approximation is quite accurate for different rates. Moreover, it is very accurate for small rates, in which case V'(r(1−Ps))≈V'(0), and large rates, in which case U'(rPs)≈0. FIG. 19 was produced with utility parameters: d=0.5, b=0.1.

In the case of loss-insensitive traffic, due to the sigmoid shape of Ps($\gamma$) in FIG. 15, the target can be adjusted using the following algorithm, as already described previously:

```
IF ABS(PSR(k)-PSR_old)/Step > F_high*PSR(k)/Gamma
    Gamma += Step
    PSR_old=PSR(k)
ELSE IF ABS(PSR(k)-PSR_old)/Step < F_low*PSR(k)/Gamma
    Gamma -= Step
    PSR_old=PSR(k)
where:
PSR(k) : packet success rate at step k
Gamma : target E_b/N_0
Step : update step
F_high, F_low : parameters (e.g. 1.1, 0.9)
```

In the present embodiment the above algorithm is extended for the case of loss-sensitive traffic by adding a parameter K, which corresponds to the negative term in the right hand side of (32). Note that the value of K is higher for higher loss-sensitivity. Also, note that K depends on the transmission rate, hence would need to be modified each time the transmission rate changes. Hence, we have the following algorithm for adjusting the target $\gamma$:

```
IF ABS(PSR(k)-PSR_old)/Step > (F_high*PSR(k)-K)/Gamma
    Gamma += Step
    PSR_old=PSR(k)
ELSE IF ABS(PSR(k)-PSR_old)/Step < (F_low*PSR(k)-K)/Gamma
    Gamma -= Step
    PSR_old=PSR(k)
where:
PSR(k): packet success rate at step k
Gamma : target E_b/N_0
Step : update step
F_high, F_low : parameters (e.g. 1.1, 0.9)
```

Other forms of the user utility can lead to slightly different outer loop power control algorithms for adjusting the target bit-energy-to-noise-density ratio. In all cases, however, the parameters used by the algorithm and its complexity are similar to that of the algorithm presented above. In actual systems, it is anticipated that one of very few algorithms will be implemented, corresponding to the most common forms of the user utility.

Turning now to a consideration of the downlink for loss-sensitive traffic, the capacity constraint in the downlink is in terms of the maximum power $\bar{p}$ that the base station can transmit i.e. from (10):

$$\sum_i p_i \leq \bar{p}.$$

Hence, an incentive compatible pricing scheme would be for the network to charge the mobile users in proportion to the power $p_i$. In this case, the user optimisation problem becomes maximize $U_i(r_iP_s(\gamma_i)) - V_i(r_i(1-P_s(\gamma_i))) - \lambda p_i$ over $r_i \geq 0, \gamma_i \geq 0$ (34)

where $\lambda$ is the shadow price for resource $p_i$, and the variables $r_i$, $\gamma_i$, and $p_i$ are related through $$\gamma_i = \frac{W}{r_i} \frac{g_i p_i}{I_i + \eta_i}$$

where $I_i = \theta_i g_i \sum_{j \neq i} p_j$ is the interference experienced at mobile i, due to signals destined to other mobiles.

One can prove that (30) holds in the downlink, as was the case with loss-insensitive traffic. Hence, the models and procedures discussed above for loss-sensitive traffic in the uplink for the uplink can also be applied in the downlink.

Moreover, as was the case for loss-insensitive traffic, because congestion in the downlink is due to the transmitted power from the base station, mobile users in the downlink are differentiated by their distance from the base station.

The actual method required for resource control for loss-sensitive traffic is identical to those described earlier for loss-insensitive traffic, but with the differences that the different utility maximisation optimisations (29) (for the uplink), and (34) for the downlink are used. In either case the RNC communicates the shadow price lambda for the resource which is of relevance to the mobile handset, and the handset then calculates the resource usage which will maximise the utility according to the relevant optimisation (29) or (34). Where the uplink is being considered, once the optimal resource usage has been found by the handset, the handset can simply start transmitting at a transmit rate and power which uses the relevant resource (for the uplink $r_i\gamma$), at the appropriate rate.

Where the downlink is being considered the handset must find the optimal resource usage rate, and then signal the optimal resource usage rate to the base station, which then transmits at the rate and power to match the optimised usage. For the downlink it is the power p which is the dominant resource, as evident from (34).

In the above embodiment we have assumed that the packet success rate is a function only of the target bit-energy-to-noise-density ratio. However, in practise it may be that the required signal quality γ in order to achieve the same packet success probability is smaller for higher bit rates. This is due to the fact that the performance depends on the accuracy of the channel and bit-energy-to-noise-density ratio, $E_b/N_o$, estimation algorithms, which are based on reference symbols in the physical control channels.

More particularly, the more power allocated to the control channel, the more accurate the estimation procedure. The power levels for the control channels is typically higher for higher bit rates, hence higher bit rates yield better performance in terms of the packet success probability, for the same target $E_b/N_o$.

If we consider the packet success rate to be of the form $Ps(\gamma,r)$, then the uplink user optimisation problem is maximize $U_i(r_i P_s(\gamma_i, r_i)) - \lambda r_i \gamma_i$ over $r_i \geq 0, \gamma_i \geq 0$     (35)

where λ is the shadow price for resource $r_i \gamma_i$.

One can prove that a necessary condition for achieving the optimal in (35) is the following $$\frac{\partial P_S}{\partial \gamma} \gamma_i^* = P_S + \frac{\partial P_S}{\partial r} r_i^* \quad (36)$$

In the last equation, because $$\frac{\partial P_S}{\partial r} > 0,$$

the optimal $\gamma_i^*$ is lower than when there is no dependence of the packet success rate on the transmission rate.

In a further embodiment, therefore, the above is taken into account by using (35) as the optimisation for the uplink. The remaining operations to decide the resource usage are as previously described.

In all of the previously described embodiments we have considered rates to be continuous. In WCDMA, however, rates can only obtain discrete values. Indeed, different rates can be selected with different spreading factors, which are powers of 2. In the uplink, the spreading factor can take values from 256, giving a channel bit rate of 15 Kbps, to 4, giving a channel bit rate of 960 Kbps; higher bit rates are achieved by using up to 6 parallel codes with spreading factor 4 (giving a channel bit rate of 5740 Kbps). Hence, in the uplink, assuming ½ rate coding, the user data rate with a single code can be 7.5, 15, 30, 60, 120, 240, and 480 Kbps. In a further embodiment to be describe in the following, we take the discrete nature of available rates into account.

In the case of loss-sensitive traffic the user optimisation problem is given by (29) as:

maximize $U_i(r_i P_s(\gamma_i)) - V_i(r_i(1-P_s(\gamma_i))) - \lambda r_i \gamma_i$ over $r_i \geq 0, \gamma_i \geq 0$ The above can be simplified if we assume the approximation $Ps(\gamma) \approx 1$, in which case the last equation becomes maximize $U_i(r_i) - \lambda r_i \gamma_i(r_i)$ over $r_i \geq 0$     (37)

Observe that the optimisation in the last equation is in terms of a single variable, the transmission rate, while the function $\gamma_i(r_i)$ hides the details of loss-sensitivity and is implicitly performed by the outer loop power control algorithm, which solves (30). Moreover, note that (37) has the same form with the corresponding problem in the case of loss-insensitive traffic. The only difference is that now the bit-energy-to-noise-density ratio depends on the transmission rate; the latter dependence is expressed through the function $\gamma_i(r_i)$.

Considering that the transmission rate can obtain discrete values, a procedure for adjusting the transmission rate in the case of direct price communication, i.e., the shadow price is communicated from the wireless network to mobile users which then adjust their transmission rate, is the following:

An initial selection of r is made. Because the number of discrete rate values is 7 (for the uplink), a simple linear search for the rate that maximizes (37) can be used.

Neighbouring rates are examined to see whether they yield a larger user benefit in (37). If a neighbouring rate is found to give a higher benefit, then the next rate in the same direction is examined; this procedure is repeated throughout the duration of the connection.

The objective function in (37) contains the function $\gamma_i(r_i)$. There are some alternatives as to how (and if) this information is stored in the base station and used in the procedure for finding the optimal transmission rate. The first alternative is to have a table which holds, for each mobile, the values for the pair ($\gamma_i, r_i$); this table can be updated with the values obtained from outer loop power control. Hence, each time a new rate is examined to determine whether the resulting benefit is higher than the benefit for the current rate, the corresponding value for $\gamma_i$ is looked up in the table. A second alternative is not to maintain a table with the pairs ($\gamma_i, r_i$). Rather, when examining a new rate, the value of $\gamma_i$ corresponding to the current rate is used for computing the benefit. Such an approach would of course be less accurate, but has the advantage of not requiring a table for storing the pairs ($\gamma_i, r_i$).

Figure 20:
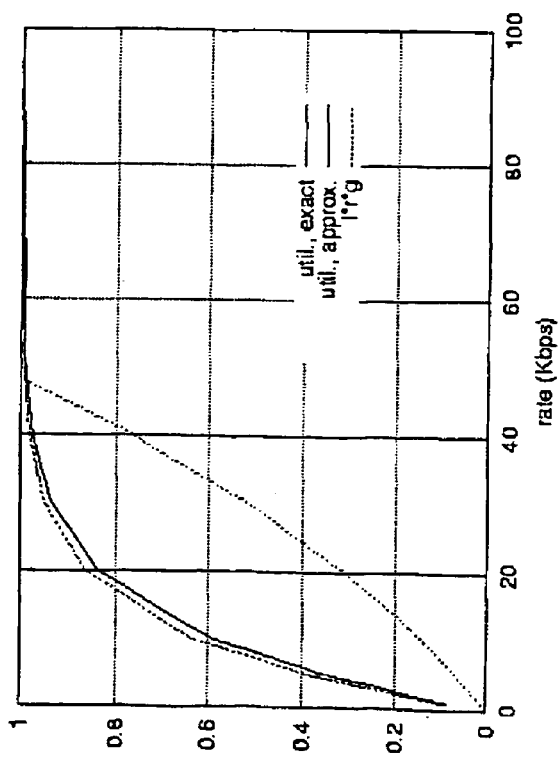
FIG. 20 is a graph illustrating utility as a function of rate.

Next we illustrate the accuracy of the approximation for rate selection described above. FIG. 20 shows that the exact and approximate value of the user utility, appearing in (29) and (37) respectively, are very close. FIG. 20 was generated with utility parameters: b=0.1, d=0.5, c=1.4. Also observe that the charge λγr is an increasing convex function of the rate r; this is due to the fact that γ is an increasing function of r, see FIG. 19.

Figure 21:
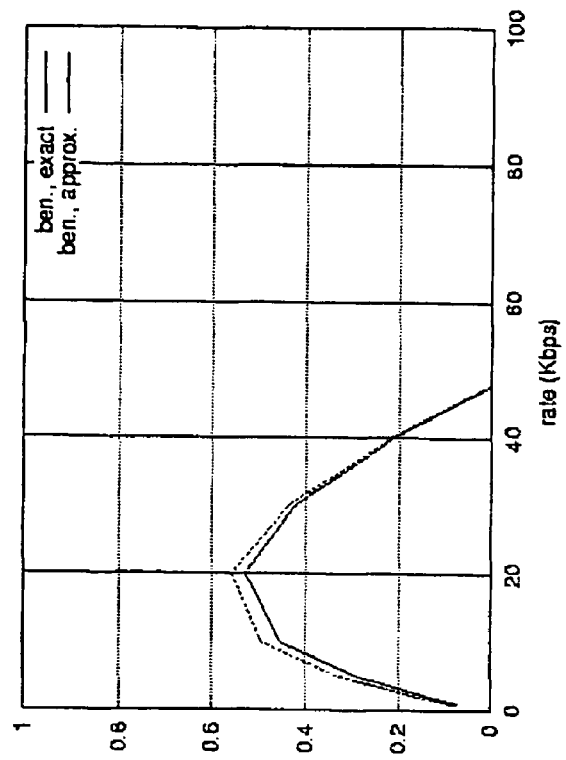
FIG. 21 is a graph illustrating user benefit as a function of rate.

The user benefit (utility minus charge) for both the exact and approximate expressions of the user utility are shown in FIG. 21, which was generated with the same utility parameters as FIG. 20. Observe that the maximum value for both is achieved for the same transmission rate; this result justifies the approximation described in the previous section.

The reader will no doubt have noted by now that the optimal utility function will depend upon the type of traffic, and how the user is sensitive to deficiencies in that traffic. For completeness, we will briefly describe other user utility functions which may form the basis of embodiments of the invention.

If a user is sensitive to the loss ratio, rather than loss rate, then his utility can take the following form $U_i(r_i P_s(\gamma_i)) - V_i(1-P_s(\gamma_i))$ The corresponding condition that the optimal $\gamma_i^*$ must satisfy is the following (for simplicity we drop the function variables)

$$P'_S \gamma_i^* = \frac{U'_i}{U'_i + \frac{V'_i}{r_i}} P_S$$

Because both $U_i$ and $V_i$ are increasing functions, the ratio on the right hand side of the above equation is less than 1, hence due to the sigmoid shape of $P_s(\gamma)$, (see FIG. 15), the resulting optimal $\gamma i^*$ given by the above equation, as expected, is smaller than in the case of loss-insensitive traffic.

Next consider a user utility where the factor that is a function of the loss rate affects the utility in a multiplicative way:

$$U_i(r_i P_s(\gamma_i)) V_i(r_i(1-P_s(\gamma_i)))$$

where now $V(y)$ is a decreasing concave function with values in [0,1]. It is concave because when the packet success probability is close to 1, corresponding to the case where the loss rate is close to 0, then an additional increase of the loss rate does not change the user utility much. The corresponding condition that gives the optimal $\gamma i^*$ is the following (for simplicity we drop the function variables)

$$P'_S \gamma_i^* = P_S + \frac{U_i V'_i}{U'_i V_i - U_i V'_i}$$

Because $V_i$ is a decreasing function, the ratio on the right hand side of the above equation is negative, hence again the optimal $\gamma_i^*$ is larger in the case of loss-sensitive traffic.

Finally, consider the case where the loss-sensitivity factor is a function of the loss ratio, rather than the loss rate, $$U(r P_s(\gamma)) V(1-P_s(\gamma))$$

where now the condition that gives the optimal $\gamma_i^*$ is the following (for simplicity we drop the function variables)

$$P'_S \gamma_i^* = \frac{U'_i V_i}{U'_i V_i - \frac{U_i V'_i}{r_i}} P_S$$

Because $V(y)$ is a decreasing function, the ratio on the right hand side of the above equation is less than 1, hence again the optimal $\gamma_i^*$ is larger in the case of loss-sensitive traffic.

Models similar to the above can be obtained for the following general forms of the user utility function $$U_i(r_i P_s(\gamma_i), P_s(\gamma_i))$$

and $$U_i(r_i, P_s(\gamma_i))$$

For all the above utility models, the condition for the optimal $\gamma_i^*$, similar to (30), involves the packet success probability, its derivative, the target signal quality (bit-energy-to-noise-density ratio), and the partial derivatives of the utility function. For this reason, the corresponding procedures all have similar complexity.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of wireless communication network resource control for use in a wireless communication network user terminal, the method comprising:
    a) said user terminal storing a user utility function which gives a communication network user utility value (U) for a communication network user terminal as a function of one or more wireless communication network resources local to the user terminal, and price per unit of wireless communication network resource usage external to the user terminal;
    b) said user terminal receiving from a wireless network controller an indication of the price per unit of wireless communication network resource usage available in the network over a wireless communication network link from another wireless communication network terminal;
    c) said user terminal calculating a rate of wireless communication network resource usage for the user terminal using the indicated price per unit of wireless communication network resource usage external to the user terminal as an input to the communication network user utility function as well as resources local to the user terminal such that the communication network user utility value (U) is maximized; and
    d) the user terminal thereafter communicating at a rate which causes the wireless resources to be used at the calculated rate.

2. A method according to claim 1, wherein the receiving step further comprises:
    receiving data packets from the other wireless terminal, a sub-set of said packets having one or more explicit congestion notification (ECN) bits set; and
    calculating the price per unit of wireless resource from the proportion of data packets in the sub-set in comparison to the total number of data packets received.

3. A method according to claim 1, wherein the wireless resources comprise any one or more of a transmission rate; a transmission bit-energy to noise spectral density ratio; transmission power; user terminal battery power; and/or one or more time periods in which a user may transmit.

4. A method according to claim 1, and further comprising transmitting data over an uplink from the user terminal to the other wireless terminal at a rate which causes the wireless resources to be used at the calculated rate.

5. A method according to claim 4, wherein the other wireless terminal and user terminals are operable to perform code division multiple access (CDMA), and wherein the user utility function is given by:

$$U = U(r \cdot P_s(\gamma)) - \lambda r \gamma$$

wherein:
    U is the user utility value;
    U(x) is the user utility function;
    r is the transmission rate;
    $\gamma$ is the transmission bit-energy to noise spectral density ratio;
    $P_s(\gamma)$ is the probability of a bit being received successfully with respect to $\gamma$; and
    $\lambda$ is the price per unit of wireless resource ($r\gamma$).

6. A method according to claim 1, wherein the other wireless terminal and user terminals are operable to perform code division multiple access (CDMA), and wherein the user utility function is given by:

$$U = U_i(r_i P_s(\gamma_i)) - V_i((r_i(1-P_s(\gamma_i))) - \lambda r_i \gamma_i$$

wherein:
U is the user utility value;
U(x) is the user utility function;
r is the transmission rate;
γ is the transmission bit-energy to noise spectral density ratio;
Ps(γ) is the probability of a bit being received successfully with respect to γ;
λ is the price per unit of wireless resource (rγ); and
V(x) is a decreasing concave function taking values in [0,1].

7. A method according to claim 5, wherein the calculating step (c) further comprises:
receiving indication of a target optimal γ* such that the number of bits successfully transmitted over the uplink per unit of energy is maximized; and
using the received optimal value γ* and the received price per unit of wireless resource rγ as inputs, calculating the transmission rate r at which the user utility value U is maximized.

8. A method according to claim 1, and further comprising:
signalling to the other wireless terminal the calculated rate of wireless resource usage; and
receiving data over a downlink at a transmission rate which matches the calculated rate of wireless resource usage.

9. A method according to claim 8, wherein the other wireless terminal and user terminal are operable to perform code division multiple access (CDMA), and wherein the user utility function is given by:

$$U = U(r \cdot P_s(\gamma)) - \lambda p$$

wherein:
U is the user utility value;
U(x) is the user utility function;
r is the transmission rate;
γ is the transmission bit-energy to noise spectral density ratio;
Ps(γ) is the probability of a bit being received successfully with respect to γ;
p is the transmission power of the network to the user terminal; and
λ is the price per unit of power (p).

10. A method according to claim 8, wherein the other wireless terminal and user terminal are operable to perform code division multiple access (CDMA), and wherein the user utility function is given by:

$$U = U_i(r_i P_s(\gamma_i)) - V_i(r_i(1 - P_s(\gamma_i))) - \lambda p_i$$

wherein:
U is the user utility value;
U(x) is the user utility function;
r is the transmission rate;
γ is the transmission bit-energy to noise spectral density ratio;
Ps(γ) is the probability of a bit being received successfully with respect to γ;
p is the transmission power of the network to the user terminal;
λ is the price per unit of power (p); and
V(x) is a decreasing concave function taking values in [0,1].

11. A method according to claim 9, wherein the calculating step (c) further comprises:
selecting a target optimal γ* such that the number of bits successfully transmitted over the downlink per unit of energy is maximized; and
using the selected optimal value γ* and a received price per unit of power p as inputs, calculating the transmission rate r at which the user utility value U is maximized; and
signalling the calculated transmission rate r to the other wireless terminal as the rate of wireless resource usage.

12. A method according to claim 1, wherein the user utility function further incorporates a function of price per unit of bandwidth in a fixed network to which said wireless network is linked.

13. A method according to claim 1, wherein the user utility function further incorporates a function of cost per unit of user terminal battery power, and a measure of user terminal battery power.

* * * * *